(12) United States Patent
Shikano et al.

(10) Patent No.: US 9,784,899 B2
(45) Date of Patent: Oct. 10, 2017

(54) LED ILLUMINATION APPARATUS

(71) Applicant: U-technology Co., Ltd., Tokyo (JP)

(72) Inventors: Shuji Shikano, Miyagi (JP); Kenji Umetsu, Miyagi (JP)

(73) Assignee: U-technology Co., Ltd., Tokyo (JP)

( * ) Notice: Subject to any disclaimer, the term of this patent is extended or adjusted under 35 U.S.C. 154(b) by 0 days.

(21) Appl. No.: 15/147,047

(22) Filed: May 5, 2016

(65) Prior Publication Data

US 2016/0349434 A1 Dec. 1, 2016

(30) Foreign Application Priority Data

Jun. 1, 2015 (JP) ................................ 2015-111526
Oct. 14, 2015 (JP) ................................ 2015-202721

(51) Int. Cl.
*F21V 8/00* (2006.01)
(52) U.S. Cl.
CPC ......... *G02B 6/0008* (2013.01); *G02B 6/0006* (2013.01)
(58) Field of Classification Search
USPC ..................................... 362/555; 359/484.03
See application file for complete search history.

(56) References Cited

U.S. PATENT DOCUMENTS

| | | | |
|---|---|---|---|
| 6,921,920 B2 | 7/2005 | Kazakevich | |
| 7,345,312 B2 | 3/2008 | Kazakevich | |
| 7,540,645 B2 | 6/2009 | Kazakevich | |
| 7,959,338 B2 | 6/2011 | Kazakevich | |
| 8,545,077 B2 | 10/2013 | Kazakevich | |
| 9,116,282 B2 | 8/2015 | Kazakevich | |
| 2010/0282984 A1* | 11/2010 | Kreysing | ................ B03C 5/026 250/492.1 |
| 2010/0309439 A1* | 12/2010 | Bi | ...................... G03B 21/2033 353/33 |
| 2011/0149592 A1 | 6/2011 | Artsyukhovich et al. | |
| 2014/0300962 A1* | 10/2014 | Hosokawa | ............. B23K 26/08 359/484.03 |
| 2015/0346427 A1 | 12/2015 | Kazakevich | |
| 2017/0059763 A1* | 3/2017 | Lucrecio | ............. G02B 6/4204 |

FOREIGN PATENT DOCUMENTS

| | | |
|---|---|---|
| JP | 2007-148418 A | 6/2007 |
| JP | 2009-198736 A | 9/2009 |
| JP | 2013-515346 A | 5/2013 |

* cited by examiner

*Primary Examiner* — Allyson Trail
(74) *Attorney, Agent, or Firm* — Studebaker & Brackett PC

(57) ABSTRACT

The present invention is characterized in that a light emitting part of LED 1 has a planar and point-symmetrical shape, a light emission angle distribution is a Lambert distribution and a light emission face is a scattering face; a hemispheric mirror 3 forms a reflection face 3a on the interior face, and has an aperture 3b at the center, while the reflection face 3a is disposed so as to oppose to LED 1; a normal line of LED 1 and an optical axis of the hemispheric mirror 3 are coincident with each other; an interval between LED 1 and the hemispheric mirror 3 is equal to or smaller than a curvature radius of the hemispheric mirror 3; a dimension of the aperture 3b of the hemispheric mirror 3 is substantially equal to a radiation dimension; and sin $(\tan^{-1} d \, LED/2t) \approx NA$ object is established.

10 Claims, 16 Drawing Sheets

LED ILLUMINATION APPARATUS

INCORPORATION BY REFERENCE

This application is based on and claims the benefit of priority from Japanese Patent applications No. JP2015-111526 filed on Jun. 1, 2015 and No. JP2015-202721 filed on Oct. 14, 2015, the entire contents of which are incorporated herein by reference.

BACKGROUND

The present disclosure relates to an LED illumination apparatus for use in endoscopy or the like.

SUMMARY

Illumination light of an endoscope is guided from a light source to a tip end by an optical fiber and then is radiated. A xenon lamp of the order of 100 W to 300 W is often used as a light source, and an input of 200 lm/mm$^2$ to 300 lm/mm$^2$ or more in volume to an optical fiber of which diameter is 1 mm to 3 mm is required. In recent years, in order to ensure the extended service life or high efficiency, an attempt to employ such an LED illumination apparatus as a light source has been made.

Japanese Unexamined Patent Application Publication No. 2009-198736 is directed to an illumination apparatus and an endoscope which form output light of an LED as an image on an optical fiber end face by a lens optical system, and describes optimization of an incident NA (Numerical Aperture) and an emission NA of the optical system. In this system, in a case where all luminous fluxes of the LED have been focused on the optical fiber end face by the same NA as the optical fiber NA by employing an ideal optical system, the following relational expression is established by the Etendue conservation law:

LED diameter×LED NA=Optical fiber diameter×
Optical fiber NA

In respect of a chip LED in which a light emission angle distribution is a Lambert distribution, because of LEDNA=1, a relational expression that LED Diameter=Optical Fiber Diameter×Optical Fiber NA is established. Therefore, all of the luminous fluxes of the LED of which diameter is 1 mm can be made incident to an optical fiber of which diameter is 1.67 mm and NA is 0.6, for example.

However, according to the invention described in Japanese Unexamined Patent Application Publication No. 2009-198736, there has been a problem that in a case where an LED of which luminance is 100 Mcd/m$^2$ is employed, the optical fiber input of 113 lm/mm$^2$ in volume is obtained, and this input volume is small in comparison with that of the Xenon lamp.

In addition, referring to FIG. 7 of Japanese Unexamined Patent Application Publication No. 2007-148418, an LED and an optical fiber are abutted against each other, and if the LED and the optical fiber are the same as each other in shape, all of the luminous fluxes are temporarily incident to an optical fiber end face; and however, a ray more than the NA of the optical fiber leaks out of the optical fiber, and the light is not guided to an emission end. In a case where the optical fiber NA is 0.6, the incidence efficiency of this method is obtained as follows:

Optical Finer Input/LED Output=Optical Fiber
NA$^2$=0.6$^2$=0.36

Therefore, according to the invention described in Japanese Unexamined Patent Application Publication No. 2007-148418, there has been a problem that in a case where an LED of which luminance is 100 Mcd/m$^2$ is employed, the optical fiber input of 113 lm/mm$^2$ in volume is obtained, and this input volume is small in comparison with that of the Xenon lamp.

Further, according to FIG. 2 of the invention described in Japanese Unexamined Patent Application Publication No. 2013-515346, a method of returning a part of LED light to an LED by a hemispheric mirror and increasing luminance of the LED is effective; and however, there is a problem with the LED shape, the layout, and the focusing lens or the like; and therefore, there has been a problem that the efficiency is lowered.

According to an aspect of the present disclosure, there is provided an LED illumination apparatus including an LED and a hemispheric mirror, wherein the LED has a planar and point-symmetrical shape at a light emitting part thereof, a light emission angle distribution of which is a Lambert distribution and a light emission face of which is a scattering face; the hemispheric mirror forms a reflection face on an interior face thereof, and has an aperture at a center thereof, while the reflection face is disposed so as to oppose to the LED; a normal line of the LED and an optical axis of the hemispheric mirror are coincident with each other; an interval between the LED and the hemispheric mirror is equal to or smaller than a curvature radius of the hemispheric mirror; a dimension of the aperture of the hemispheric mirror is substantially equal to a radiation dimension; and when a dimension of the LED is d LED, the interval between the LED and the hemispheric mirror is t, and a radiation NA is NA object, a relational expression that sin (tan$^{-1}$ d LED/2t) ≈NA object is established.

According to another aspect of the present disclosure, there is provided an LED illumination apparatus including an LED and a plano convex lens mirror, wherein the LED has a planar and point-symmetrical shape at a light emitting part thereof, a light emission angle distribution of which is a Lambert distribution and a light emission face of which is a scattering face; the plano convex lens mirror forms a reflection face at a periphery of a convex interior face thereof, and has an aperture of the reflection face at a center thereof, while the LED and a planar side of the plano convex lens mirror are disposed at intervals so as to oppose to and to be parallel to each other; a normal line of the LED and an optical axis of the plano convex lens mirror are coincident with each other; an interval between the LED and a spherical face of the plano convex lens mirror is equal to or smaller than a curvature radius of the plano convex lens mirror; a dimension of the aperture of the plano convex lens mirror is substantially equal to a radiation dimension; and when a dimension of the LED is d LED, the interval between the LED and the plano convex lens mirror is t, a refractive index of the plano convex lens mirror is n, and a radiation NA is NA object, a relational expression that n sin(tan$^{-1}$ d LED/2t)≈NA object is established.

Further, the present disclosure is characterized in that an optical fiber is disposed at a position of the aperture of the mirror, and the radiation NA is substantially equal to an optical fiber NA.

According to a further aspect of the present disclosure, there is provided an LED illumination apparatus including an LED and a hemispheric mirror, wherein the LED has a planar and point-symmetrical shape at a light emitting part thereof, a light emission angle distribution of which is a Lambert distribution and a light emission face of which is a scattering face; the hemispheric mirror forms a reflection face on an interior face thereof, and has a circular aperture at a center thereof, while the reflection face is disposed so as to oppose to the LED; a normal line of the LED and an optical axis of the hemispheric mirror are coincident with each other; an interval between the LED and the hemispheric mirror is equal to or smaller than a curvature radius of the hemispheric mirror; and when a dimension of the LED is d LED, the curvature radius of the hemispheric mirror is r, a diameter of a circular aperture of the hemispheric mirror is D, a focusing image dimension is d image, and a focusing light NA is NA image is NA object, a relational expression that d LED×D/2r≈d image×NA image is established.

According to a furthermore aspect of the present disclosure, there is provided an LED illumination apparatus including an LED, a hemispheric mirror, and a focusing lens, wherein the LED has a planar and point-symmetrical shape at a light emitting part thereof, a light emission angle distribution of which is a Lambert distribution and a light emission face of which is a scattering face; the hemispheric mirror forms a reflection face on an interior face thereof, and has a circular aperture at a center thereof, while the reflection face is disposed so as to oppose to the LED; a normal line of the LED and an optical axis of the hemispheric mirror are coincident with each other; an interval between the LED and the hemispheric mirror is equal to or smaller than a curvature radius of the hemispheric mirror; the focusing lens is disposed so that an optical axis thereof is disposed so as to be coincident with a normal line of the LED; and when a dimension of the LED is d LED, the curvature radius of the hemispheric mirror is r, a diameter of the circular aperture of the hemispheric mirror is D, a focusing image dimension is d image, a focusing light NA is NA image, and a focal length of the focusing lens is f, a relational expression that d LED×D/2r≈d image×NA image and f≈r×d image/d LED is established.

According to a still furthermore aspect of the present disclosure, there is provided an LED illumination apparatus including an LED and a plano convex lens mirror, wherein the LED has a planar and point-symmetrical shape at a light emitting part thereof, a light emission angle distribution of which is a Lambert distribution and a light emission face of which is a scattering face; the plano convex lens mirror forms a reflection face at a periphery of an interior face thereof, and has a circular aperture at a center thereof, while the LED and a planar side of the plano convex lens mirror are disposed at intervals so as to oppose to and to be parallel to each other; a normal light of the LED and an optical axis of the plano convex lens mirror are coincident with each other; an interval between the LED and a spherical face of the plano convex lens mirror is equal to or smaller than a curvature radius of the plano convex lens mirror; and when a dimension of the LED is d LED, the curvature radius of the plano convex lens mirror is r, a diameter of the circular aperture of the plano convex lens mirror is D, a dimension of a focusing image is d image, a focusing light NA is NA image, and a refractive index of the plano convex lens mirror is n, a relational expression that d LED×nD/2r≈d image×NA image is established.

According to a yet furthermore aspect of the present disclosure, there is provided an LED illumination apparatus including an LED, a plano convex lens mirror, and a focusing lens, wherein the LED has a planar and point-symmetrical shape at a light emitting part thereof, a light emission angle distribution of which is a Lambert distribution and a light emission face of which is a scattering face; the plano convex lens mirror forms a reflection face at a periphery of an interior face thereof, and has a circular aperture at a center thereof, while the LED and a planar side of the plano convex lens mirror are disposed at intervals so as to oppose to and to be parallel to each other; an interval between the LED and a spherical face of the plano convex lens mirror is equal to or smaller than a curvature radius of the plano convex lens mirror; the focusing lens is disposed so that an optical axis thereof is coincident with the normal line of the LED; and when a dimension of the LED is d LED, the curvature radius of the plano convex lens mirror is r, a diameter of the circular aperture of the plano convex lens mirror is D, a dimension of a focusing image is d image, a focusing light NA is NA image, a refractive index of the plano convex lens mirror is n, and a focal length of the focusing lens is f, a relational expression that d LED×nD/2r≈d image×NA image and f≈r×d image/d LED/n is established.

In addition, the present disclosure may be characterized in that an optical fiber is disposed at a position of the focusing image, and the focusing light NA is substantially equal to an optical fiber NA.

According to the present disclosure, there can be attained a variety of excellent effects such as the fact that an LED illumination apparatus with a large input can be achieved without a need to change an LED output.

The above and other objects, features, and advantages of the present disclosure will become more apparent from the following description when taken in conjunction with the accompanying drawings in which a preferred embodiment of the present disclosure is shown byway of illustrative example.

DETAILED DESCRIPTION

Hereinafter, an LED illumination apparatus according to embodiments of the present disclosure will be described in detail with reference to the accompanying drawings.

First, referring to FIG. 1 and FIG. 2, a description will be given with respect to a ray tracing chart in an LED illumination apparatus according to a first embodiment and a ray tracing chart in a conventional LED illumination apparatus for optical fiber.

Figure 2:
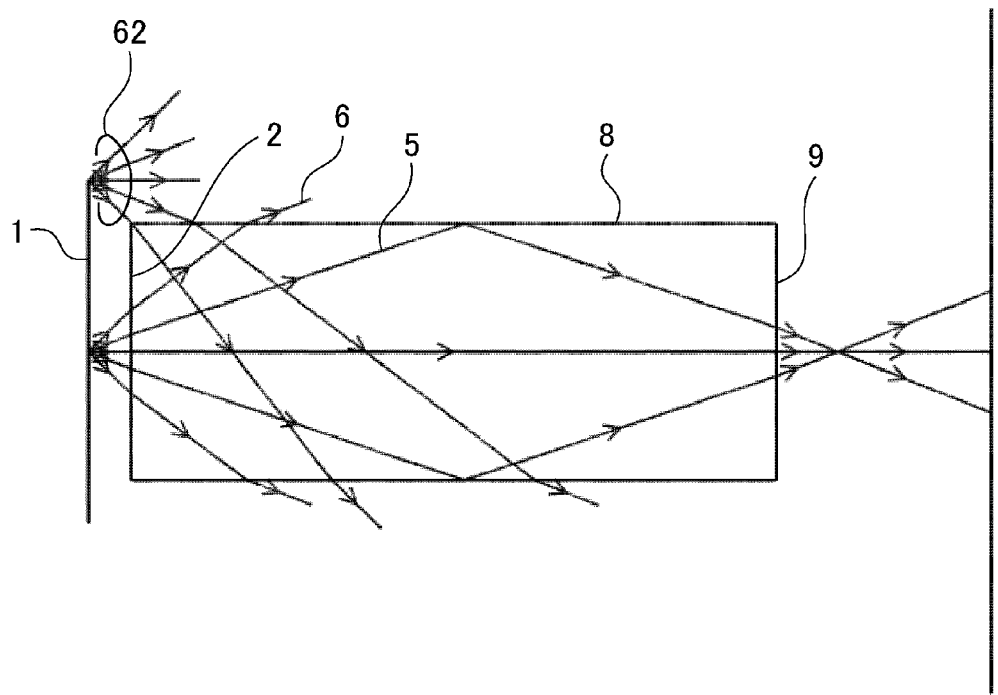
FIG. 2 shows a ray tracing chart in a conventional LED illumination apparatus for optical fiber.

FIG. 2 shows a ray tracing chart of a conventional LED light source for butt-coupled optical fiber. A diameter of LED 1: d LED is 4 mm, a diameter of an optical fiber 8: d fiber is 3 mm, optical fiber NA: NA fiber is 0.6, an interval between the LED 1 and the optical fiber 3 is sufficiently small, and a normal line of the LED 1 and an optical axis of the optical fiber 8 is disposed so as to be coincident with each other.

A ray 62 emitted from the LED 1 at the outside more significantly than the optical fiber diameter is not incident to an end face 2 of an optical fiber 8, and the light is not guided by the optical fiber. Although the ray emitted from the LED 1 at the inside more significantly the optical fiber diameter is incident to an end face of the optical fiber 8, the ray 6 that is incident at a greater NA than the optical fiber NA travels to the outside more significantly than a side face of the optical fiber 8, and the light is not guided up to an emission end 9 of the optical fiber 8. A ray 5 to be guided is a ray emitted from the inside more significantly than the optical fiber diameter and then incident to the optical fiber 8 at the NA that is equal to or smaller than the NA of the optical fiber 8.

Therefore, efficiency of this optical system is obtained as follows:

Light volume guided by optical fiber 8/Output light volume of LED $1 = (d\ fiber/d\ LED)^2 \times NA\ fiber^2 = (3/4)^2 \times 0.6^2 = 0.203$ According to the present disclosure, an interval between an LED 1 and the optical fiber 8 is optimized and then the incidence NA and NA of the optical fiber 8 is made coincident with each other and further the light of a large NA which cannot be guided by the optical fiber 8 is returned to an LED 1 by the mirror 3, and a scattering effect of the LED 1 is utilized to convert the returned light so as to be able to be guided by the optical fiber 8, and an input of the light to the optical fiber 8 is thereby increased.

Figure 1:
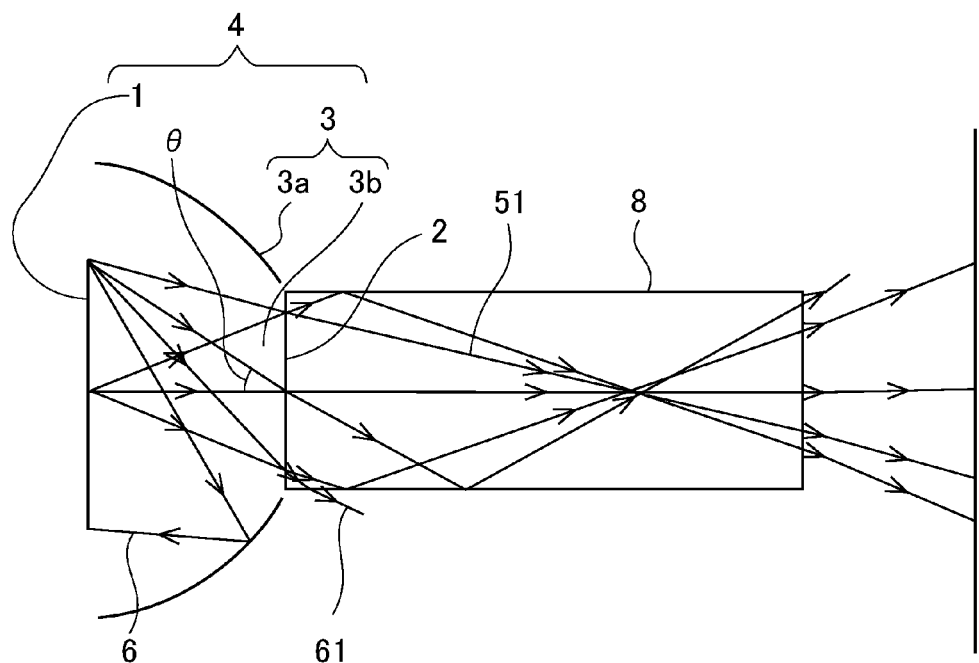
FIG. 1 shows a ray tracing chart in an LED illumination apparatus according to a first embodiment of the present disclosure.

FIG. 1 shows a ray tracing chart of an LED illumination apparatus 4 according to a first embodiment of the present disclosure. In a light source apparatus made of: an LED 1 of which light emitting part is formed in a planar and point-symmetrical shape, a light emission angle distribution of which is a Lambelt distribution and a light emission face of which is a scattering face; and a hemispgeric mirror 3 of which interior face forms a reflection face 3a, and which has an aperture 3b at a center thereof, the reflection face 3a is disposed so as to oppose to the LED 1, a normal line of the LED 1 and an optical axis of the hemispheric mirror 3 are coincident with each other, an interval of the LED 1 and the hemispheric mirror 3 is equal to or smaller than a curvature radius of the hemispheric mirror 3, an optical fiber 8 is disposed in an aperture 3b of the hemispheric mirror 3, and an aperture diameter of the hemispheric mirror 3 is equal to an optical fiber diameter.

Rays emitted from the LED 1 and passing through the aperture 3b of the hemispheric mirror 3 are directly incident to an end face of the optical fiber 8. Of these rays, the light to be guided by the optical fiber 8 must be incident in the NA which is equal to or smaller than the NA of the optical fiber 8. In the case of the ray from an upper end of the LED toward an optical fiber center in FIG. 1, the light is not guided unless sine of an angle θ which is formed with respect to the optical axis of the optical fiber 8 is equal to or smaller than the NA of the optical fiber 8.

That is, the following relational expression is established:

$$\sin \theta = \sin(\tan^{-1} d\,\text{LED}/2t) \leq \text{NA fiber} \qquad 5$$

where variable t is an interval between the LED 1 and a center of the hemispheric mirror 3.

In this relational expression, the incidence NA of a ray 61 which is incident from the upper end of the LED 1 to a lower end of the optical fiber 8 is greater than the optical fiber NA, and the light is not guided. Conversely, a ray 51 emitted from the upper end of the LED 1 and incident to the upper end of the optical fiber 8 has a sufficient margin with respect to a light guiding limitation exerted by the NA of the optical fiber 8. In order to obtain high incidence efficiency with respect to all of the rays that are emitted from the LED 1, it is desirable that a relational expression that $\sin(\tan^{-1} d\,\text{LED}/2t) \approx \text{NA fiber}$ be established.

With respect to a ray 6 which cannot be guided by the optical fiber 8, an image of the LED 1 is formed to be point-symmetrical on the LED 1 by the reflection face 3a. In order to ensure that the LED 1 and the image of the LED 1 are coincident with each other, the shape of the LED 1 must be point-symmetrical. As long as the light emission angle distribution of the LED 1 is the Lambert distribution, all of the rays 6 that are emitted from anywhere other than the aperture 3b can be returned to the LED 1 side by the reflection face 3a. As long as the surface of the LED 1 is a scattering face, the rays that have been returned to the LED 1 scatter and then are emitted toward the aperture 3b and the reflection face 3a. The rays that have been emitted toward the aperture 3b contribute to an increase of the input of the optical fiber 8. The rays that have been emitted toward the reflection face 3a are also emitted from the aperture 3b later while reflection and scattering are repeated between the LED 1 and the mirror 3.

Figure 3:
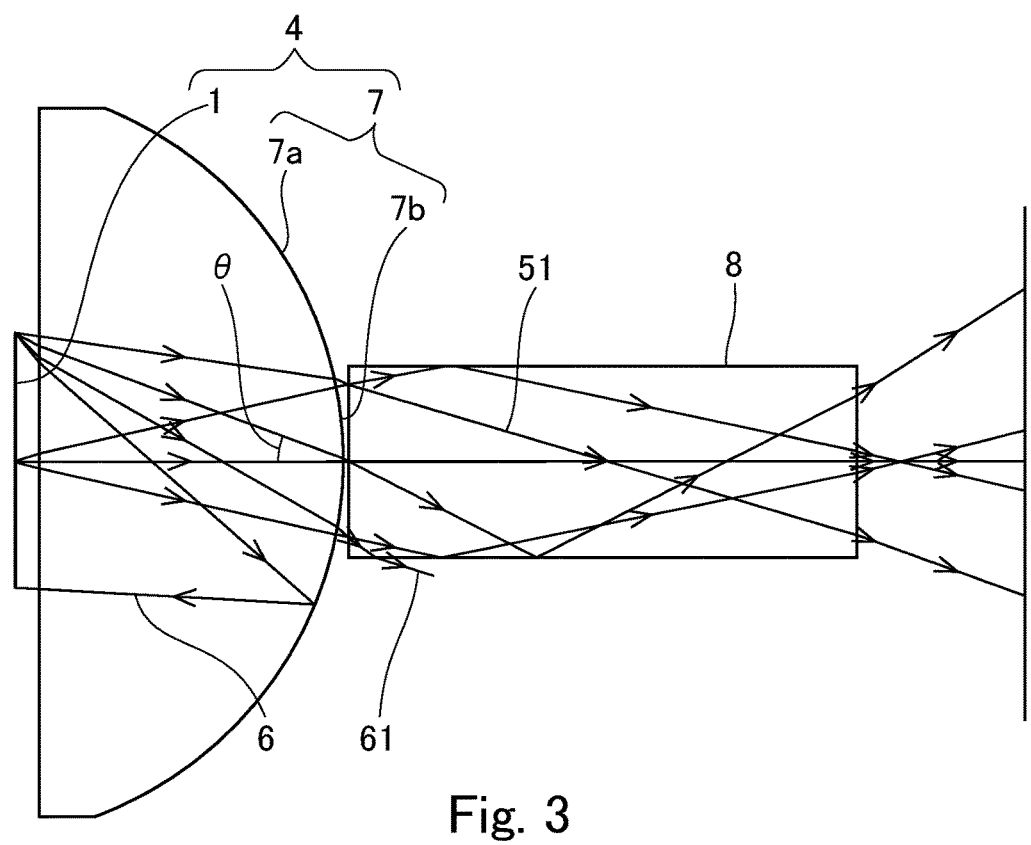
FIG. 3 shows a ray tracing chart in an LED illumination apparatus according to a second embodiment of the present disclosure.

FIG. 3 shows a ray tracing chart of an LED illumination apparatus 4 according to a second embodiment of the present disclosure. This LED illumination apparatus is a light source apparatus made of: an LED 1, a light emitting part of which is formed in a planar and point-symmetrical shape, a light emitting angle distribution of which is a Lambert distribution, and a light emission face of which is a scattering face; and a plano convex lens mirror 7, a reflection face 7a of which is formed at the periphery of a convex interior face and has an aperture 7b of the reflection face at a center thereof, whereas the apparatus is characterized in that the LED 1 and a planar side of the plano convex lens mirror 7 are disposed at intervals so as to oppose to and to be parallel to each other, a normal line of the LED 1 and an optical axis of the plano convex lens mirror 7 are coincident with each other, an interval between the LED 1 and a spherical face of the plano convex lens mirror 7 is equal to or smaller than a curvature radius of the plano convex lens mirror 7, an optical fiber 8 is disposed in a mirror 7b, and a mirror aperture diameter is equal to an optical fiber diameter.

Rays emitted from the LED 1 and passing through the aperture 7b of the plano convex lens mirror 7 are directly incident to an end face of the optical fiber 8. Of these rays, the ray to be guided by the optical fiber 8 must be incident in accordance with the NA that is equal to or smaller than the NA of the optical fiber 8. In the ray from the upper end of the LED 1 toward the center of the optical fiber 8 in FIG. 3, the light is not guided unless sine of the angle θ that is formed with respect to the optical axis of the optical fiber 8 in the lens is equal to or smaller than the NA of the optical fiber 8.

That is, the following relational expression is established:

$$n \sin \theta = n \sin(\tan^{-1} d\,\text{LED}/2t) \leq \text{NA fiber}$$

where n is a refractive index of the lens, and t is a distance between the LED 1 and a center of the reflection face. In addition, an interval between the LED or the optical fiber and the plano convex lens mirror shall be sufficiently small in comparison with t.

In this relational expression, an incidence NA of the ray 61 incident from the upper end of the LED 1 to the lower end of the optical fiber 8 is greater than the NA of the optical fiber, and the light is not guided. Conversely, the ray 51 that is emitted from the upper end of the LED 1 and incident to the upper end of the optical fiber 8 has a sufficient margin in light guiding limitation exerted by the NA of the optical fiber 8. In order to obtain a high incidence efficiency with respect to all of the rays that are emitted from the LED 1, it is desirable that a relational expression that $n \sin(\tan^{-1} d\text{LED}/2t) \approx \text{NA fiber}$ be established.

With respect to the ray 6 that cannot be guided by the optical fiber 8, the image of the LED 1 is formed to be point-symmetrical on the LED 1 by the reflection face 7a. In order to ensure that the LED 1 and the image of the LED 1 are coincident with each other, the shape of the LED 1 must be point-symmetrical. As long as the light emission angle distribution of the LED 1 is the Lambert distribution, almost of the rays 6 that are emitted from anywhere other than the aperture 7b can be returned to the LED 1 side by the reflection face 7a. As long as the surface of the LED 1 is the scattering face, the rays that have been returned to the LED 1 scatter and then are emitted toward the aperture 7b and the reflection face 7a. The rays that have been emitted to the aperture 7b contribute to the increase of the input of the optical fiber 8. The rays that have been emitted to the reflection face 7a are also emitted from the aperture 7b later while reflection and scattering are repeated between the LED 1 and the reflection face 7a.

Figure 4:
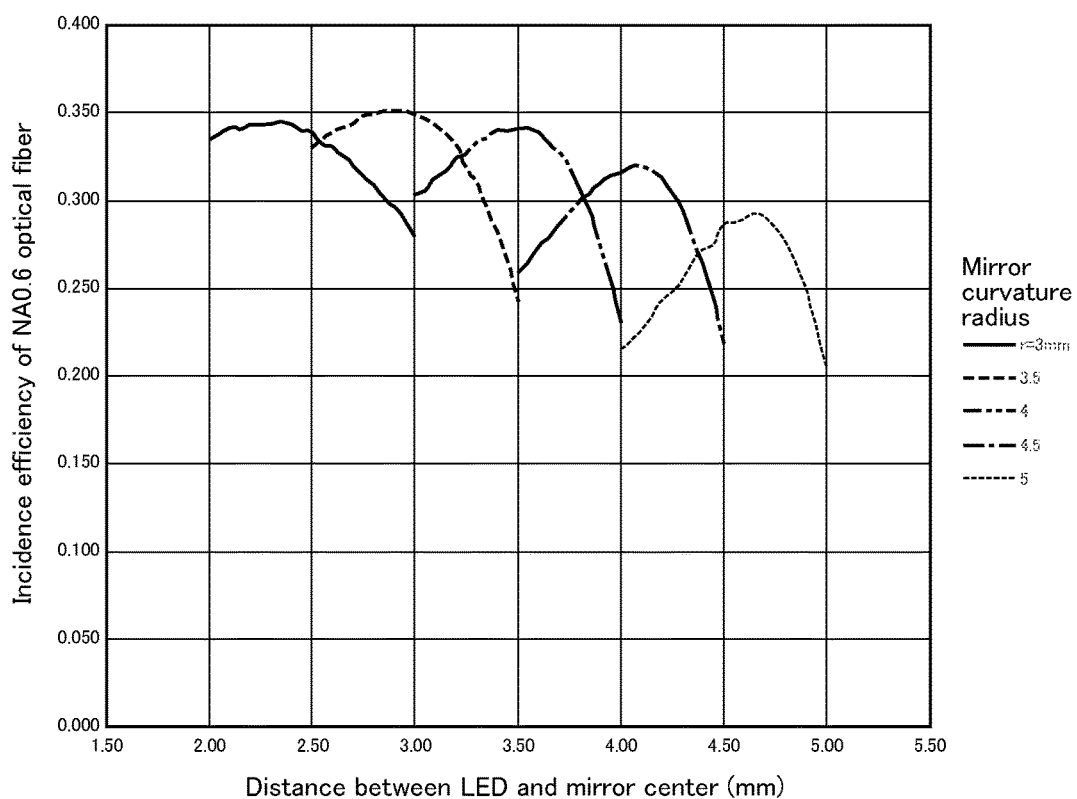
FIG. 4 shows computation values of an optical fiber input of NA0.6 in the LED illumination apparatus according to the first embodiment of the present disclosure.
Figure 5:
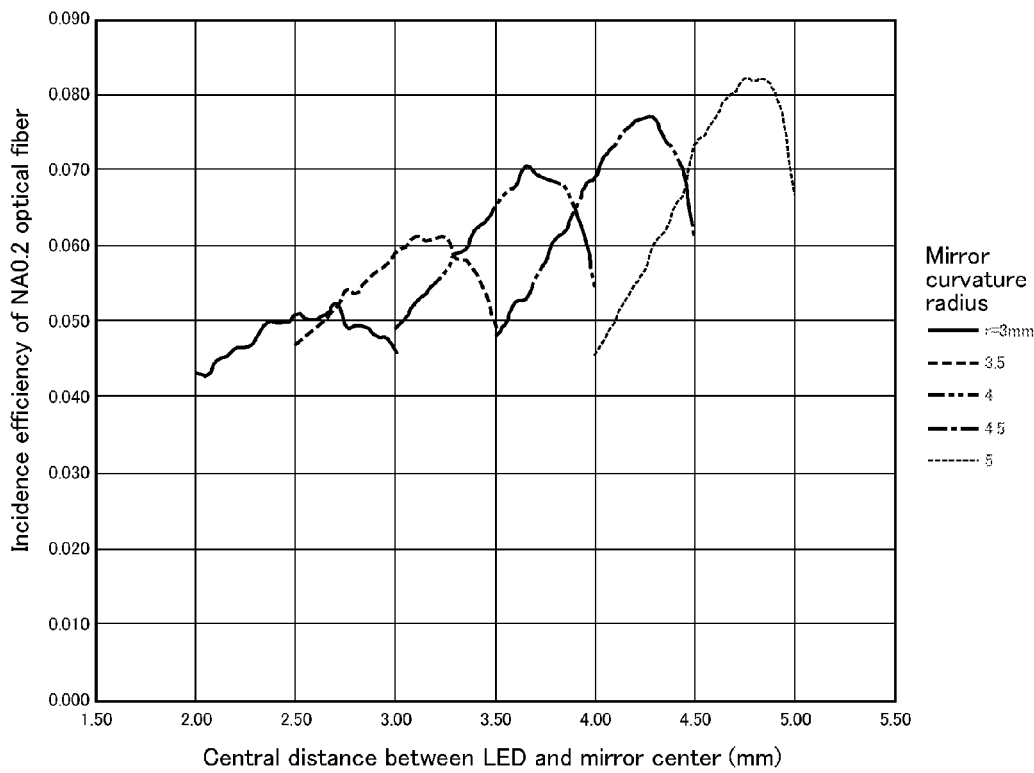
FIG. 5 shows computation values of an optical fiber input of NA0.2 in the LED illumination apparatus according to the first embodiment of the present disclosure.

FIG. 4 and FIG. 5 are diagrams showing results of Monte Carlo simulation parameterizing the mirror curvature radius: r of the incidence efficiency (optical fiber incidence luminous flux/LED output luminous flux) with respect to the optical fibers 8 of which NA is 0.6 and NA is 0.2 in the LED illumination apparatus according to the first embodiment of the present disclosure. In the figures, the LED diameter is 4 mm, the mirror aperture and the fiber diameter are equal to each other, a respective one of which is 3 mm, and the reflection coefficient of each of the mirror 3 and the LED 1 is 0.95.

With respect to the optical fiber 8 of which NA is 0.6, an efficiency peak is present when the inter-central distance between the LED 1 and the mirror 3 is 2.8 mm. With respect to the optical fiber 8 of which NA is 0.2, the longer t is, the better the efficiency is. In a case where a target of incidence NA is set to 0.6, the incidence efficiency with respect to NA0.6 is prioritized, and however, as long as the same efficiency is obtained, it is desirable that the efficiency with respect to the optical fiber 8 of NA0.2 having more components in the direction of the optical axis be higher at the emission end. Therefore, r=3.5 mm and t=3 mm are selected. The interval between the center of the mirror 3 and the optical fiber 8 is 0 mm, and the interval between an aperture of which diameter is 3 mm and the optical fiber 8 is 0.34 mm.

Figure 6:
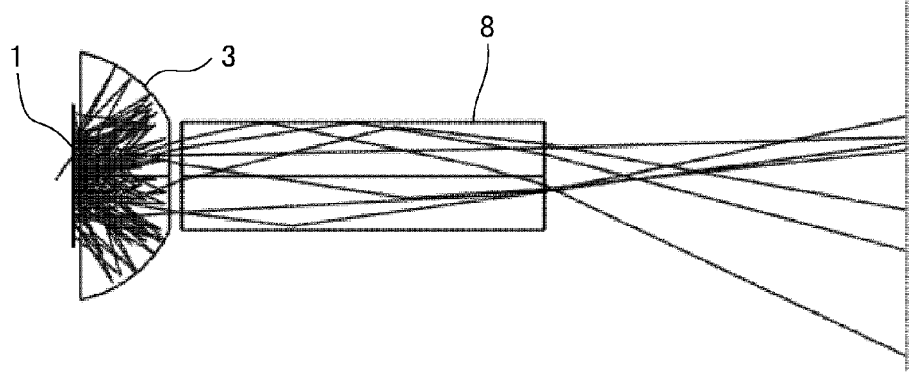
FIG. 6 shows a ray tracing chart by Monte Carlo simulation in the LED illumination apparatus according to the first embodiment of the present disclosure.

FIG. 6 shows a Monte Carlo ray tracing chart of the above designed LED illumination apparatus. Referring to the figure, it is found that a plenty of rays reciprocate between the LED 1 and the mirror 3, and only the rays having arrived at the aperture are input to the optical fiber 8.

Figure 7:
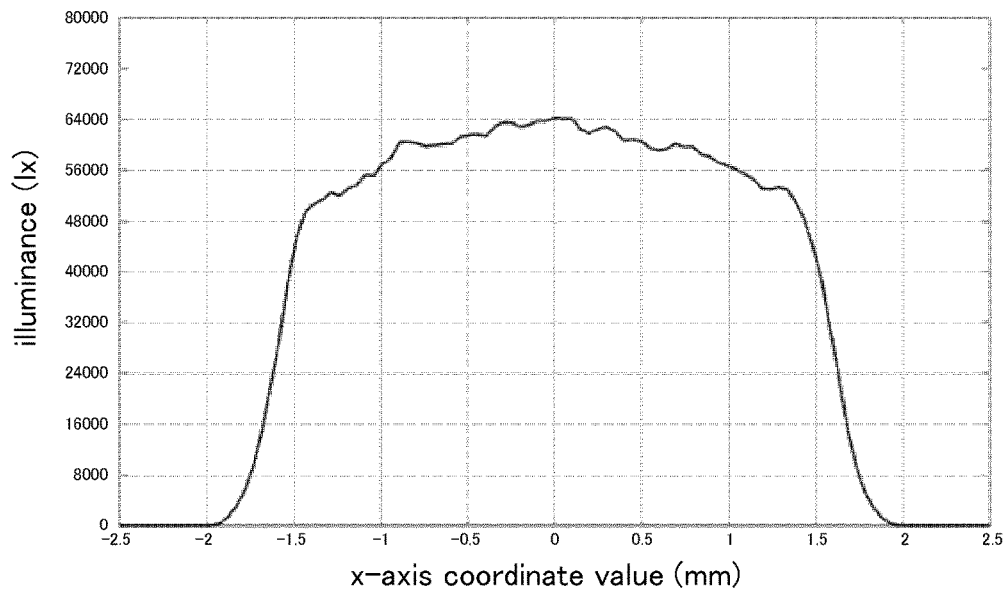
FIG. 7 shows an illuminance distribution chart of an emission face in the LED illumination apparatus according to the first embodiment of the present disclosure.
Figure 8:
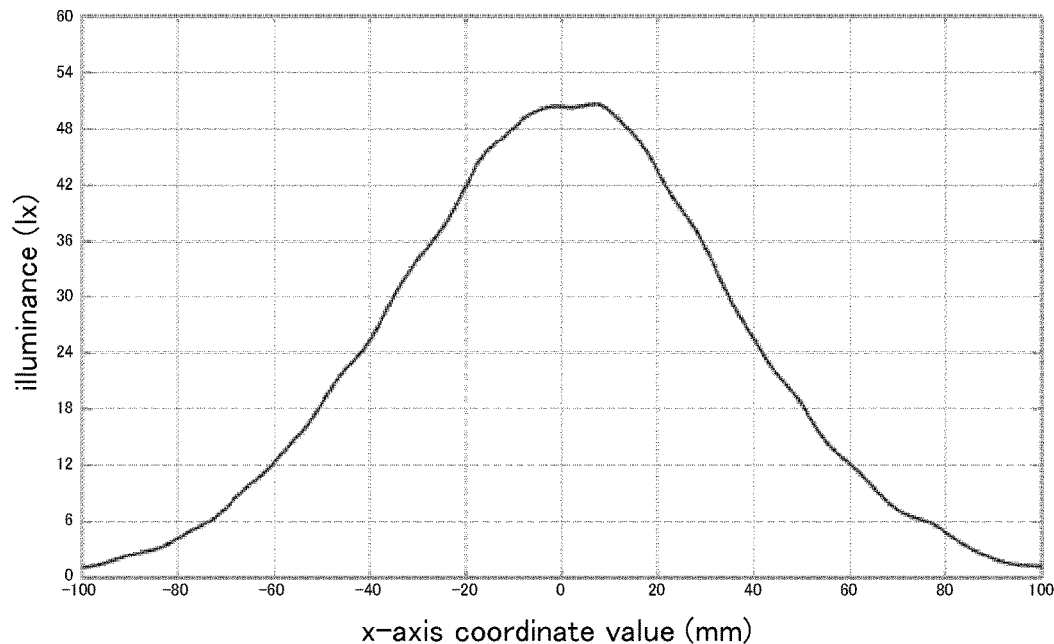
FIG. 8 shows a far field illuminance distribution chart in the LED illumination apparatus according to the first embodiment of the present disclosure.

FIG. 7 shows an illuminance distribution of an incidence end face of the optical fiber 8. Since there is a certain interval from the mirror 3, the illuminance distribution somewhat broadens. FIG. 8 shows an illuminance distribution of a position at which the optical fiber 8 is removed, an aperture of which diameter is 3 mm is placed at the end face position of the optical fiber 8, and which is far away from the aperture by 100 mm. This distribution also includes 4% of the rays of which NA is 0.6 or more (75 mm or more and −75 mm or less in x-axis coordinate) which cannot be made incident to the optical fiber 8. 10% NA (sine of the angle of 10% illuminance with respect to the central illuminance) is 0.62, and the incidence efficiency with respect to the optical fiber 8 of 0.6 is 0.35, which is 1.7 times of that of the conventional butting approach. In a case where the LED of luminance of 100 Mcd/m$^2$ is employed, the input to the optical fiber 8 is 190 lm/mm$^2$, and this value is close to that of the xenon lamp.

In the present disclosure, a relational expression that $\sin(\tan^{-1} d\ LED/2t) = \sin(\tan^{-1} 4/(2\times 3)) = 0.55 \approx 0.6 = NA$ fiber which is the design value target$\approx 0.62 = 10\%$ NA which is the NA computation value is established.

Figure 9:
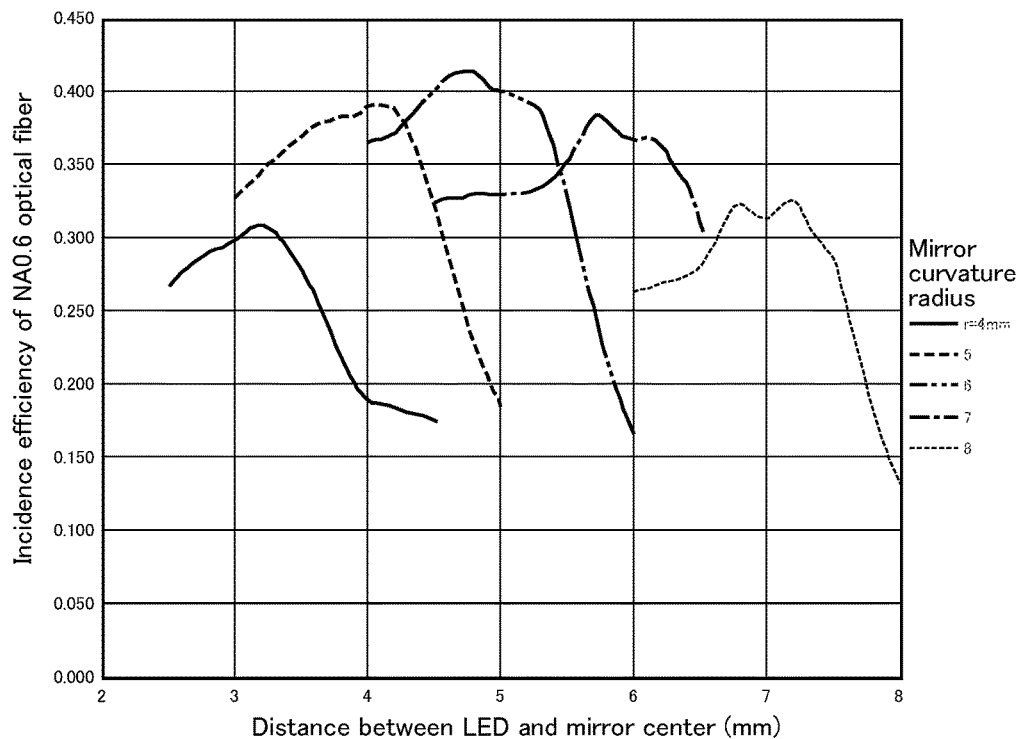
FIG. 9 shows computation values of an optical fiber input of NA0.6 in the LED illumination apparatus according to the second embodiment of the present disclosure.
Figure 10:
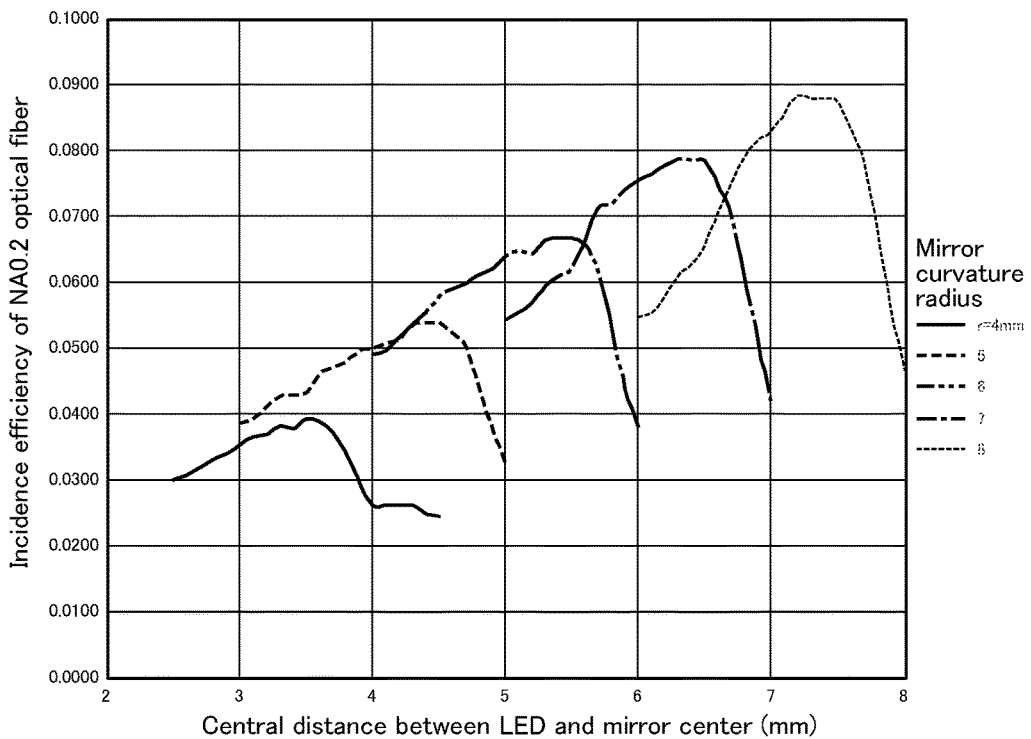
FIG. 10 shows computation values of an optical fiber input of NA0.2 in the LED illumination apparatus according to the second embodiment of the present disclosure.

FIG. 9 and FIG. 10 are views showing results of the Monte Carlo simulation parameterizing the mirror curvature radius: r of the incidence efficiency with respect to the optical fibers 8 of which NA is 0.6 and NA is 0.2 in the LED illumination apparatus according to the second embodiment of the present disclosure. In the figures, the LED diameter is 4 mm, the aperture diameter of the mirror 7 and the fiber diameter are equal to each other, a respective one of which is 3 mm, the interval between the LED 1 and the plano convex lens 7 is 0.1 mm, the interval between the plano convex lens 7 and the optical fiber 8 is 0.5 mm, the refractive index of the plano convex lens 7 is 1.516, and the reflection coefficient of each of the reflection face 7a and the LED 1 is 0.95.

Figure 11:
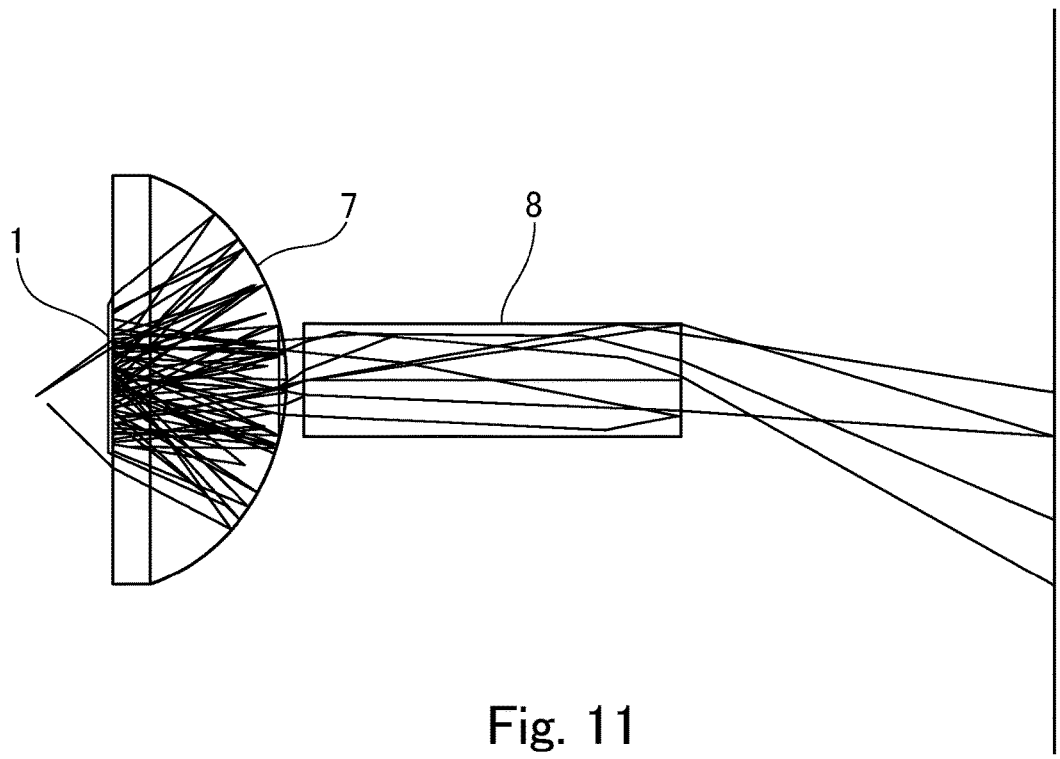
FIG. 11 shows a ray tracing chart by Monte Carlo simulation in the LED illumination apparatus according to the second embodiment of the present disclosure.

FIG. 11 shows a Monte Carlo ray tracing chart of the LED illumination apparatus in which r=6 and t=4.7 mm are selected with respect to the design target of which NA is 0.6.

Figure 12:
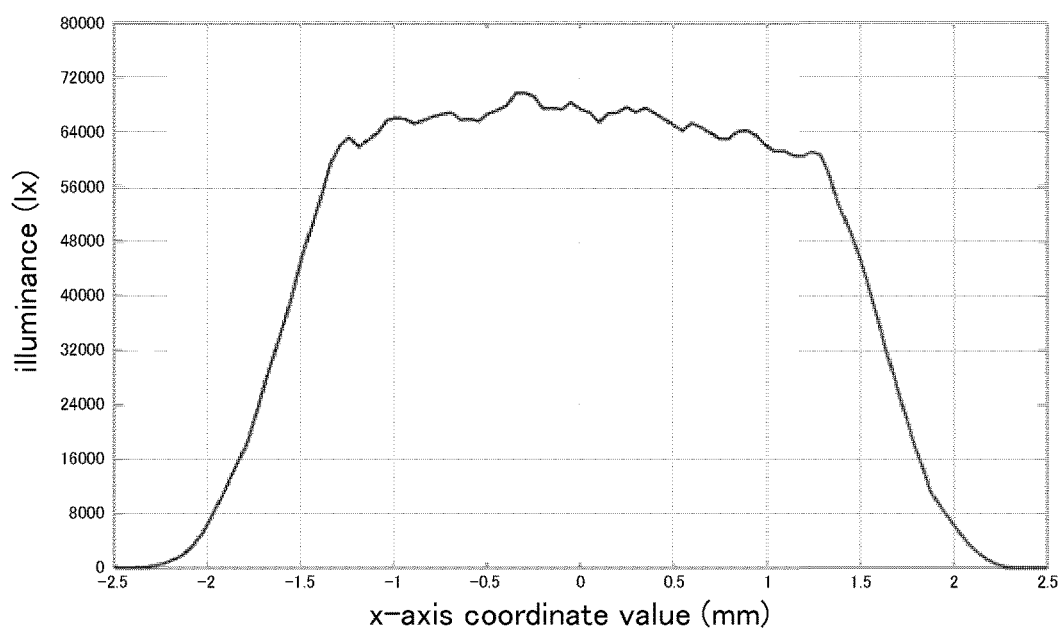
FIG. 12 shows an illuminance distribution chart of an emission face in the LED illumination apparatus according to the second embodiment of the present disclosure.
Figure 13:
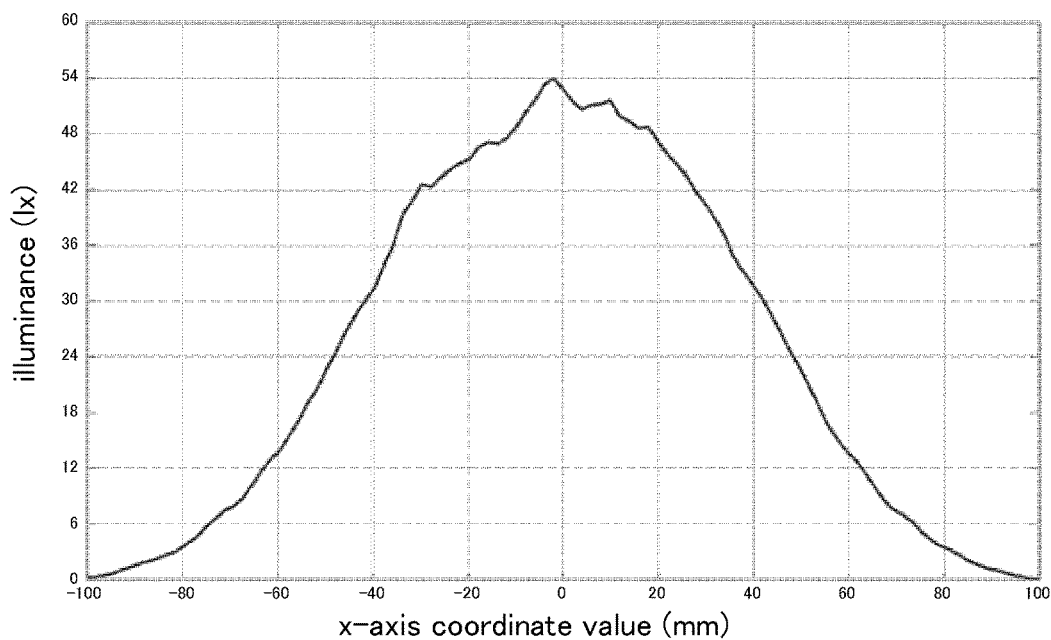
FIG. 13 shows a far field illuminance distribution chart in the LED illumination apparatus according to the second embodiment of the present disclosure.

FIG. 12 shows an illuminance distribution of the incidence end face of the optical fiber 8. FIG. 13 shows an illuminance distribution of the position which, after the aperture of which diameter is 3 mm has been placed at the end face position of the optical fiber 8, is far away from the aperture by 100 mm. This distribution also includes 3% of the rays of which NA is 0.6 or more and which cannot be made incident to the optical fiber 8. The 10% NA is 0.6, and the incidence efficiency with respect to the optical fiber 8 of which NA is 0.6 is 0.4, which is 2 times of that of the conventional butting approach. In a case where the LED of luminance of 100 Mcd/m$^2$ is employed, the optical fiber input is 226 lm/mm$^2$ in volume, and this input volume is further made closer to that of the xenon lamp.

In the present disclosure, a relational expression that $n \sin(\tan^{-1} dLED/2t) = 1.516 \times \sin(\tan^{-1} 4/(2\times 4.7)) = 0.59 \approx 0.6 = $ NA fiber which is the target of the design value and $\approx 0.6 = 10\%$ NA computation value is established.

Figure 14:
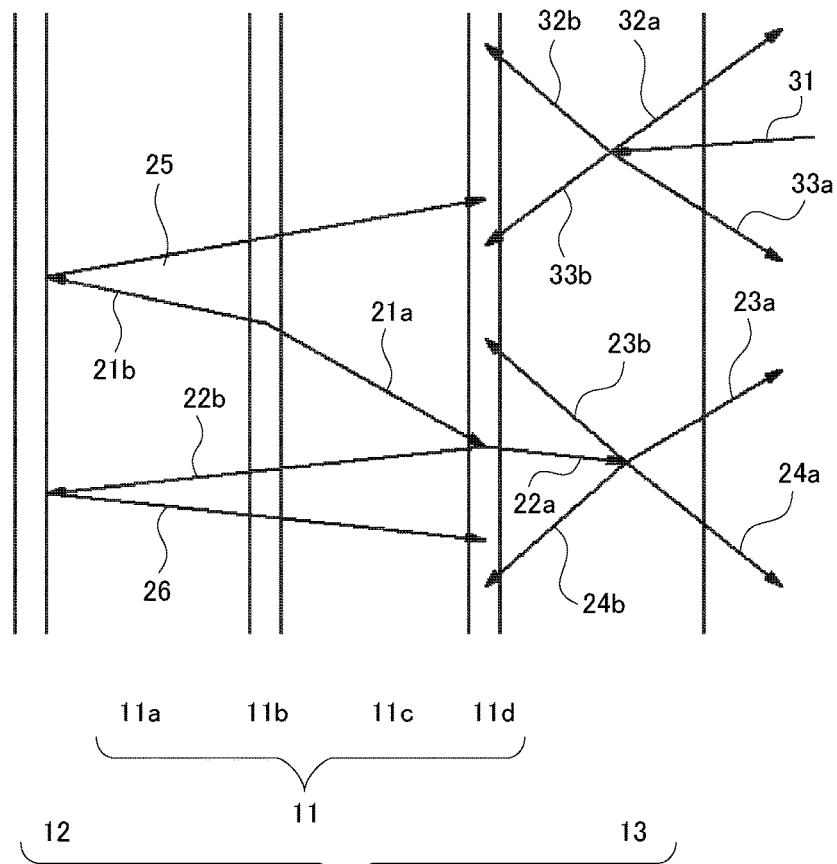
FIG. 14 is a sectional view of an LED illumination apparatus according to the present disclosure.

FIG. 14 shows an optical cross-sectional view of an incandescent LED according to the present disclosure. The LED 1, from the left and back side of the figure, is made of: a mirror layer 12; a semiconductor 11 (PN junction 11b at the center and the scattering layer 11d on the surface); and a fluorescent layer 13. Blue rays 21a, 21b are produced by PN junction. The ray 21a scatters in the scattering layer and then is divided into a ray 22a to be emitted to the surface and a ray 22b to be emitted to the back face. The ray 22a is divided into yellow rays 23a, 23b which are fluorescently scattering in the fluorescent layer and blue rays 24a, 24b which are scattering as well. The rays 23a, 24a are output as white light from the LED. The rays 21b, 22b emitted in the direction of the back face is reflected on the mirror layer, the thus reflected rays are incident to the scattering layer as rays 25, 26, and subsequently, the incident rays behave in the same manner as that of the ray 21a. The rays 23b, 24b are incident to the scattering layer, and the incident rays behave in the same manner as that of the ray 21a.

A ray 31 incident from the outside to the fluorescent layer is divided into fluorescent scattering rays 32a, 32b and scattering rays 33a, 33b. The rays 32a, 33a are emitted from the LED 1 to the outside and then the rays 32b, 33b are incident to the scattering layer and subsequently the rays behave in the same manner as that of the ray 21a.

As long as the thickness of each layer of the LED 1 in FIG. 14 is sufficiently small with respect to the diameter of the LED 1, when this LED 1 is optically macroscopically seen, the LED is a planar light emitting element to emit light in the Lamdbert distribution and is also a scattering reflection face, and is a fluorescent scattering reflection face as well.

In the present disclosure, in a case where a blue LED and an LED using a yellow phosphor are used, a color temperature of the output light of the present disclosure lowers more remarkably than the LED simplex. This phenomenon occurs because the blue light repeating reflection and scattering between the mirror and the LED is absorbed by the fluorescent substance, and yellow fluorescence is emitted, so that the blue component relatively decreases and the yellow component increases. In order to obtain the same color temperature, there is a need to reduce the volume of the fluorescent substance.

Figure 15:
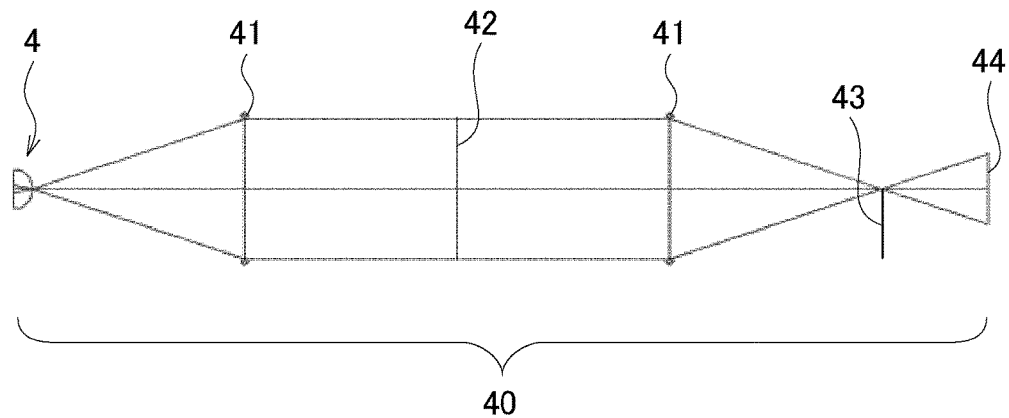
FIG. 15 shows a ray tracing chart in an LED illumination apparatus according to a third embodiment of the present disclosure.

FIG. 15 shows a third embodiment of the present disclosure. The figure also shows an example in which the LED illumination apparatus 4 according to the present disclosure is applied to the light source of the Schlieren method/apparatus 40. The mirror aperture serves as a pin hole of the light source of the Schlieren apparatus. Reference numeral 41 designates a convex lens; reference numeral 42 designates a target; reference numeral 43 designates a knife edge; and reference numeral 44 designates a screen. The LED illumination apparatus has the LED diameter of 4 mm, whereas the plano convex lens mirror has the curvature radius of 10 mm, the thickness of 9.2 mm, and the mirror aperture diameter of 1 mm, and the interval between the LED and the plano convex lens mirror is 0.2 mm.

Figure 16:
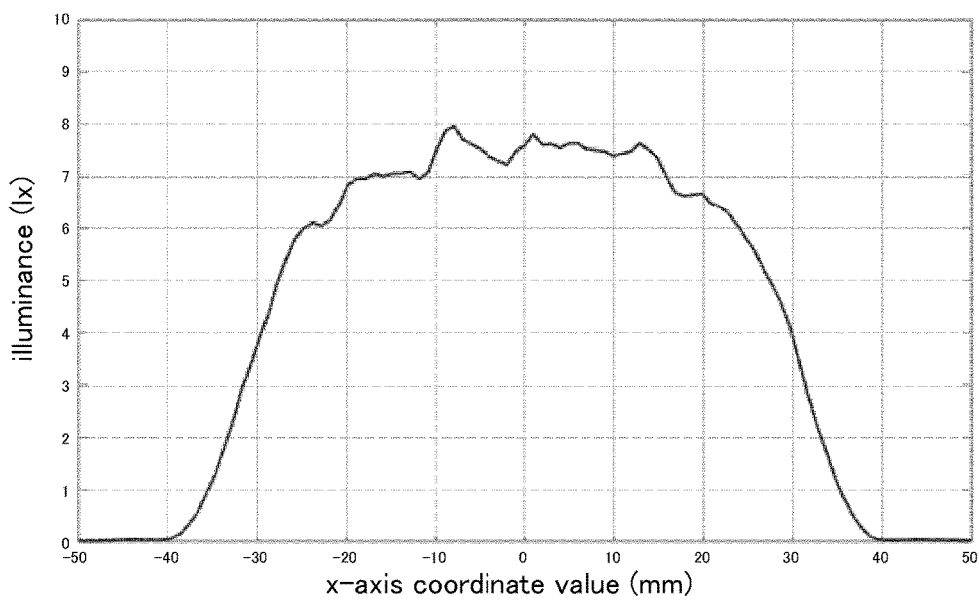
FIG. 16 is a diagram showing a result of Monte Carlo simulation of an illuminance distribution in the LED illumination apparatus according to the third embodiment of the present disclosure.

FIG. 16 shows a Monte Carlo silumation result of the illuminance distribution at a position which is far away from the mirror by 100 mm, assuming that the 10% NA is 0.339. In the present disclosure, a relational expression that $n\sin(\tan^{-1} d\ LED/2t) = 1.516 \times \sin(\tan^{-1} 4/(2\times 9.4)) = 0.315 \approx 0.339 = 10\%$ NA which is the computation value is established. In a case where the reflection coefficient of each of the LED and the mirror is 0.95, the luminance of the mirror aperture is 6 times of that of the LED, and even if the reflection coefficient is 0.9, the luminance is 4 times thereof, and this is remarkable luminance.

Hereinafter, the LED illumination apparatus of the embodiment of the present disclosure will be described in detail with reference to the accompanying drawings.

Next, referring to FIG. 17 and FIG. 18, a description will be given with respect to a paraxial approximate ray tracing chart in the LED illumination apparatus according to the fourth embodiment of the present invention and a paraxial approximate ray tracing chart in the conventional LED illumination apparatus for optical fiber.

Figure 18:
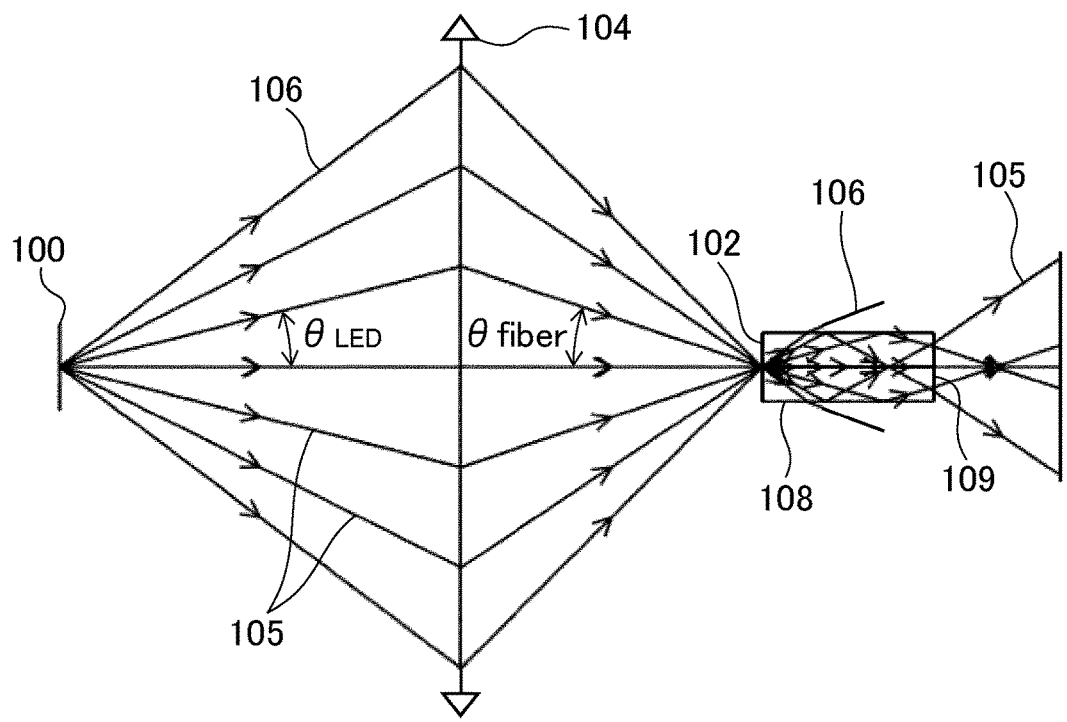
FIG. 18 shows a paraxial approximate ray tracing chart in a conventional LED illumination apparatus for optical fiber.

FIG. 18 shows the paraxial approximate ray tracing chart of the conventional LED illumination apparatus for optical fiber. In this case, a diameter of a LED 100 is 4 mm, a diameter of an optical fiber 108 is 3 mm, an optical fiber NA is 0.6, a focal length of a focusing lens 104 is 7.5 mm, and an image forming magnification is 0.75. Although an LED image is formed to be coincident with the optical fiber diameter, light 106 of sin (θ fiber)>0.6=fiber NA is not guided by the optical fiber 108, and does not arrive at an optical fiber emission end face 109.

At this time, a relational expression that sin (θ LED)=sin (θfiber)×image forming magnification is established. Therefore, the light of which NA is 0.45, emitted from the LED 100, cannot be guided by the optical fiber.

According to the present disclosure, the light of a great NA which cannot be guided by the optical fiber is returned to the LED 100 by the mirror, the scattering effect of the LED 100 is utilized to convert the thus returned light so as to be able to be guided by the optical fiber, and an input of the light to the optical fiber is thereby increased.

Figure 17:
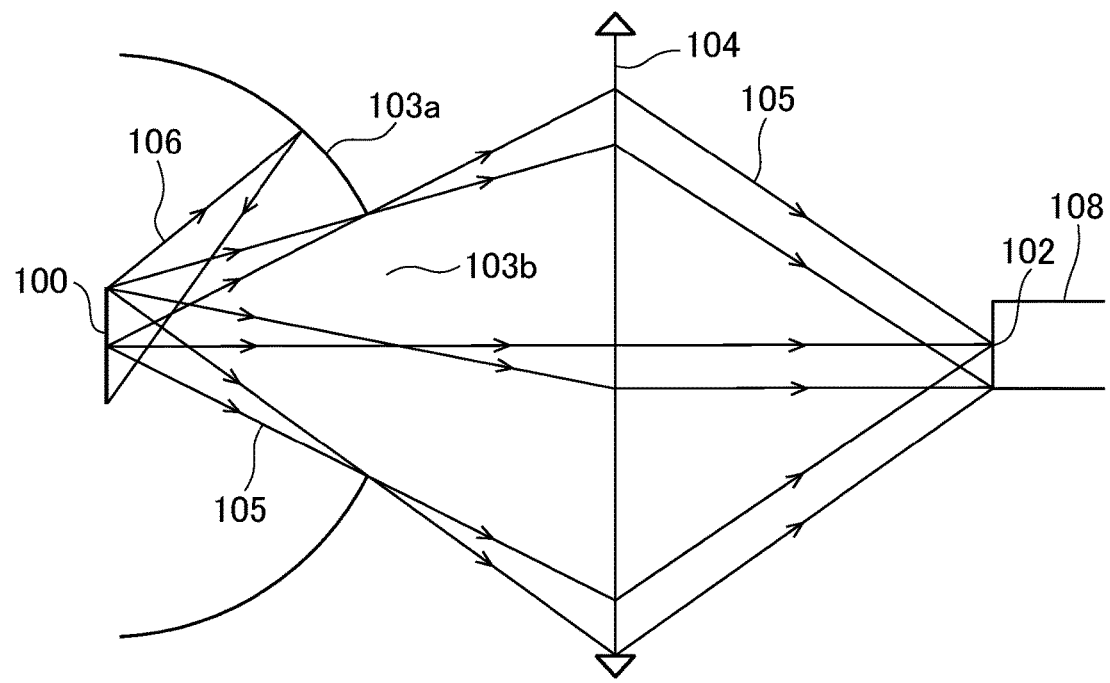
FIG. 17 shows a paraxial approximate ray tracing chart in an LED illumination apparatus in a fourth embodiment of the present disclosure.

FIG. 17 shows a paraxial approximate ray tracing chart in the LED illumination apparatus according to the fourth embodiment of the present disclosure. The LED 100 has a planar and point-symmetrical shape at a light emitting part thereof, a light emission angle distribution of which is a Lambert distribution and a light emission face of which is a scattering face; a hemispheric mirror 103 forms a reflection face 103a on an interior face thereof, and has a circular aperture 103b at a center thereof, while the reflection face 103a thereof is disposed so as to oppose to the LED 100; a normal line of the LED 100 and an optical axis of the hemispheric mirror 103 are coincident with each other; an interval between the LED 100 and the hemispheric mirror 103 is equal to or smaller than a curvature radius of the hemispheric mirror 103; and a focusing lens 104 and an optical fiber 108 are disposed so that the optical axis is made coincident with the normal line of the LED 100.

Of the emitted rays of the LED 100, only a ray 105 which can be guided by the optical fiber 108 passes through the mirror aperture 103b and then transmits through the focusing lens 104 and further is formed as an image on an optical fiber incidence end face 102. The LED 100 and the optical fiber incidence end face 102 are held in a conjugate relationship, and it is desirable that both of them be planar in shape.

With respect to a ray 106 which cannot be guided by the optical fiber 108, an image of the LED 100 is formed to be point-symmetrical on the LED 100 by the mirror 103a. In order to ensure that the LED 100 and the image of the LED 100 are coincident with each other, the shape of the LED 100 must be point-symmetrical. The light emission angle distribution of the LED 100 is the Lambert distribution, and all of the rays 106 that are emitted from anywhere other than the aperture can be returned toward the LED 100 side by the hemispheric mirror 103. As long as the surface of the LED 100 is a scattering face, the rays that have been returned to the LED 100 scatter and then are emitted toward the aperture 103b and the mirror 103a. The rays that have been emitted toward the aperture 103b are focused by the focusing lens 104, and contribute to an increase of an optical fiber input. The rays that have been emitted toward the mirror 103a are also emitted from the aperture 103b later while reflection and scattering are repeated between the LED 100 and the mirror 103. The focusing lens 104 needs to form an image so that a principal ray of the LED 100 and an optical axis of the optical fiber 108 are parallel to each other. If the principal ray and the optical axis of the optical fiber 108 are not parallel to each other, a loss is prone to occur.

In order to meet these conditions and increase an optical fiber input, a relational expression that d LED·D/2r≈d image×NA image and f≈r×d image/d LED needs to be established when the LED dimension is d LED, the curvature radius of the hemsipheric mirror is r, the diameter of the circular aperture of the hemispheric mirror is D, the dimension of the focusing image 2 (substantially equal to the optical fiber) is d image, the focusing light NA (substantially equal to NA of the optical fiber) is NA image, and the focal length of the focusing lens is f.

Figure 19:
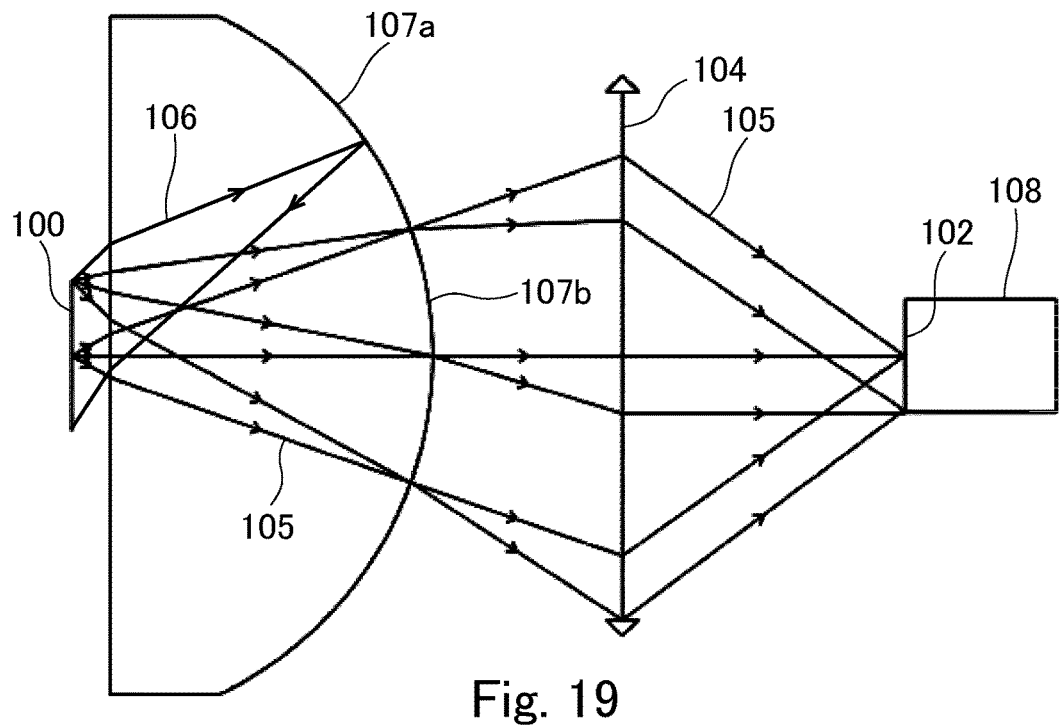
FIG. 19 shows a paraxial approximate ray tracing chart in an LED illumination apparatus in a fifth embodiment of the present disclosure.

FIG. 19 shows a paraxial approximate ray tracing chart in the LED illumination apparatus according to the fifth embodiment of the present disclosure. The LED 100 has a planar and point-symmetrical shape at a light emitting part thereof, a light emitting angle distribution of which is a Lambert distribution and a light emission face of which is a scattering face; a plano convex lens mirror 107 forms a reflection face 107a at the periphery of a convex interior face thereof, and has a circular aperture 107b of the reflection face at a center thereof, while the LED 100 and a planar side of the plano convex lens mirror 107 are disposed at intervals so as to oppose to and to be parallel to each other; a normal line of the LED 100 and an optical axis of the plano convex lens mirror 107 are coincident with each other; an interval between the LED 100 and a spherical face of the plano convex lens mirror 107 is equal to or smaller than a curvature radius of the plano convex lens mirror 107; and a focusing lens 104 and an optical fiber 108 are disposed so that the optical axis is made coincident with the normal line of the LED 100.

Of the emitted rays of the LED 100, only a ray 105 which can be guided by the optical fiber 108 passes through a mirror aperture 107b and then passes through a focusing lens 104 and further is formed as an image on an optical fiber end face 102. The LED 100 and an optical fiber incidence end face 102 are held in a conjugate relationship, and it is desirable that both of them be planar in shape.

With respect to a ray 106 which cannot be guided by the optical fiber 108, an image of the LED 100 is formed to be point-symmetrical on the LED 100 by a mirror 107a. In order to ensure that the LED 100 and the image of the LED 100 are coincident with each other, the shape of the LED 100 must be point-symmetrical. As long as the light emission angle distribution of the LED 100 is the Lambert distribution, almost all of the rays 106 that are emitted to anywhere other than the aperture can be returned toward the LED 100 side by the plano convex lens mirror 107. As long as the surface of the LED 100 is the scattering face, the rays that have been returned to the LED 100 scatter and then are emitted toward the aperture 107b and the mirror 107a. The rays that have been emitted to the aperture 107b are focused by the focusing lens 104, and contribute to an increase of an optical fiber input.

In order to increase the optical fiber input, a relational expression that dLED×D/2nr≈d image×NA image and f≈r×d image/dLED/n needs to be established when the LED dimension is d LED, the curvature radius of the plano convex lens mirror is r, the diameter of the circular aperture of the plano convex lens mirror is D, the dimension of the focusing image (substantially equal to the dimension of the optical fiber) is d image, the focusing light NA (substantially equal to the NA of the optical fiber) is NA image, the refractive index of the plano convex lens is n, and the focal length of the focusing lens is f.

Figure 20:
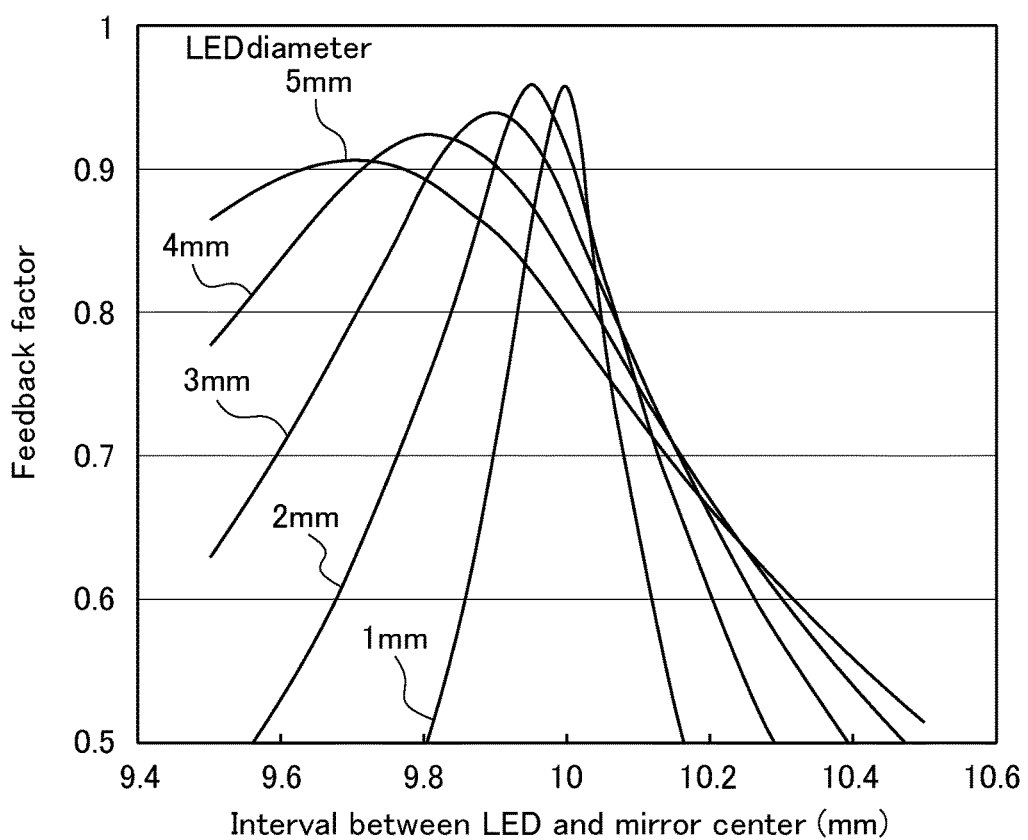
FIG. 20 is a diagram showing computation values of a feedback factor by a hemispheric mirror in the LED illumination apparatus according to the fourth embodiment of the present disclosure.

FIG. 20 is a diagram showing computation values parameterizing the LED diameter of the feedback factor (luminous flux returned to the LED/output luminous flux of the LED) of the LED light by the hemispheric mirror in the LED illumination apparatus according to the fourth embodiment of the present disclosure. In the figure, the curvature radius of the mirror is 10 mm, the aperture diameter of the mirror is 0 mm, and the reflection coefficient of the mirror is 1. Even if there is an aperture, a variation is prone to occur at a similar rate. The horixontal axis indicates the interval between the LED and the center of the mirror. When the interval is 10 mm, coincidence with the curvature radius of the mirror is obtained, and the LED is positioned at the center of the curvature circle of the mirror. There is an advantage that the smaller the LED diameter is, the closer to 1 the feedback factor is, whereas there is a disadvantage that the feedback factor is close to 0 owing to even a slight displacement, and positioning becomes difficult.

Although this graph shows a characterizing feature in the z-direction (the direction of the optical axis), a similar characterizing feature is obtained in the x and y-directions as well. Assuming that a practical assembling precision is ±0.1 mm, an LED of which diameter is 3 mm to 5 mm is suitable for use in the mirror of which curvature radius is 10 mm.

Figure 21:
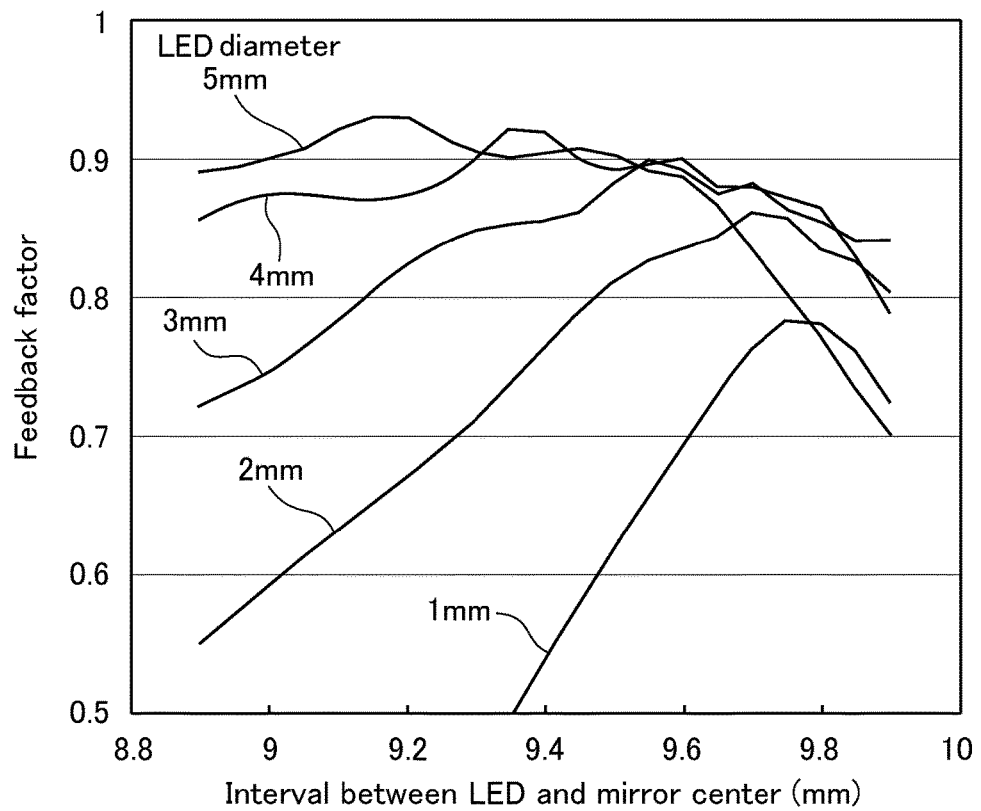
FIG. 21 is a diagram showing computation values of a feedback factor of LED light by a plano convex lens mirror in the LED illumination apparatus according to the fifth embodiment of the present disclosure.

FIG. 21 is a diagram showing computation values parameterizing the LED diameter of the feedback factor of the LED light by the plano convex lens mirror in the LED illumination apparatus according to the fifth embodiment of the present disclosure. In the figure, the curvature radius of the mirror is 10 mm, the aperture diameter of the mirror is 0 mm, the reflection coefficient of the mirror is 1, and the interval between the LED and a first face of the plano convex lens is 0.2 mm. Even if there is an aperture, a variation is prone to occur at a substantially similar rate. The horizontal axis indicates the interval between the LED and the center of the mirror face, where the feedback factor increases at the shorter intervals than the curvature radius of the mirror. When the curvature radius of the mirror face is 10 mm, an LED of which diameter is 3 mm or more is suitable. However, if the diameter is too large, inclination of the principal ray that has passed through the center of the aperture increases, and it becomes difficult to design an appropriate focusing lens.

Figure 22:
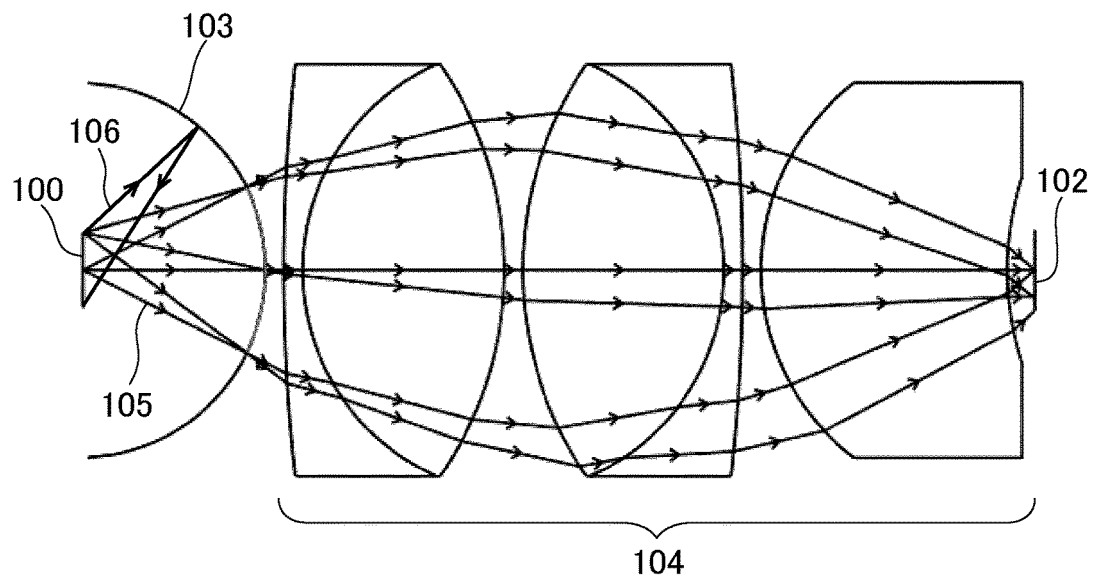
FIG. 22 shows a ray tracing chart in the LED illumination apparatus according to the fourth embodiment of the present disclosure.
Figure 23:
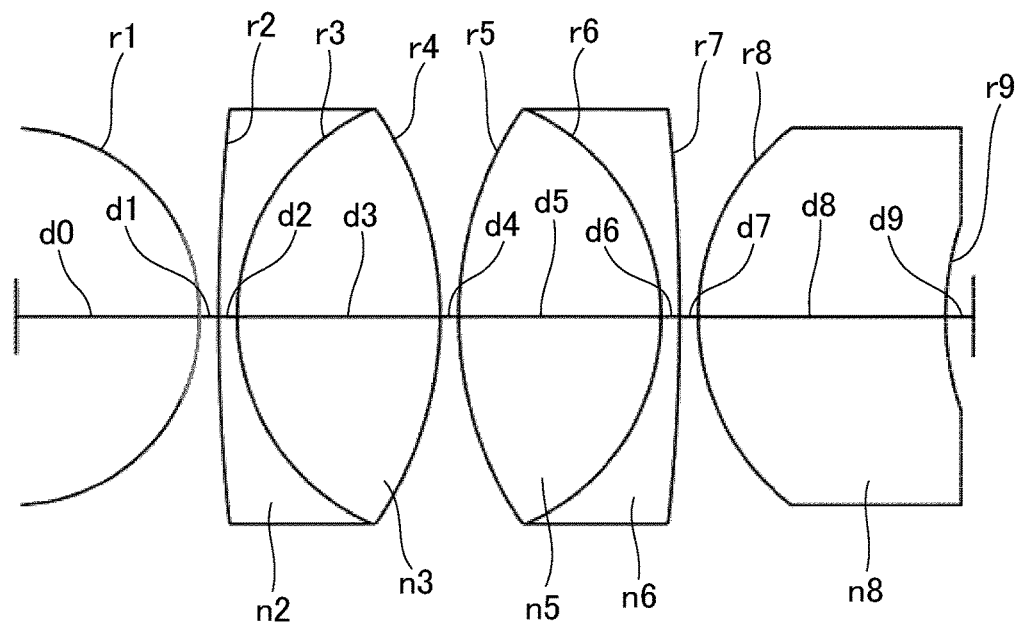
FIG. 23 is a sectional view of the LED illumination apparatus according to the fourth embodiment of the present disclosure.

FIG. 22 and FIG. 23 respectively show ray tracing charts of the hemispheric mirror 103 and the focusing lens 104 in the LED illumination apparatus according to the fourth embodiment of the present disclosure, and Table 1 shows lens data.

TABLE 1

| Face number: i | Curvature radius: ri | Interval: di | Refractive index: ni | Abbe number: vi |
|---|---|---|---|---|
| 0:: LED | Infinity | 9.8 | | |
| 1 | −10 | 1 | | |
| 2 | 99.6 | 1 | 2.0033 | 28.27 |
| 3 | 12 | 10.8 | 1.883 | 40.77 |
| 4 | −19.3 | 1 | | |
| 5 | 19.3 | 10.8 | 1.883 | 40.77 |
| 6 | −12 | 1 | 2.0033 | 28.27 |
| 7 | −99.6 | 1 | | |
| 8 | 12.5 | 13.2 | 1.883 | 40.77 |
| 9 | 15.5 | 1.5 | | |
| 10: Image | Infinity | | | |

With respect to a relational expression that between notations of the table and codes of the figures, for example, numeric value 99.6 on line 4 and column 2 represents "r2=99.6", and numeric value 1 on line 4 and column 3 represents d2=1.

The LED diameter: d LED is 4 mm, the curvature radius of the hemispheric mirror: r is 10 mm, the diameter of the circular aperture of the hemispheric mirror: D is 9 mm, the diameter of the focusing image: d image is 3 mm, the focusing light NA: NA image is 0.56, and the focal length of the focusing lens: f is 7.3 mm; and therefore, a relational expression that d LED·D/2r=4×9/(2×10)=1.8≈1.68=3×0.56=d image×NA image, f=7.3≈7.5=10×3/4=r×d image/d LED is established. The distance between the LED and the image is 51.1 mm.

Figure 24:
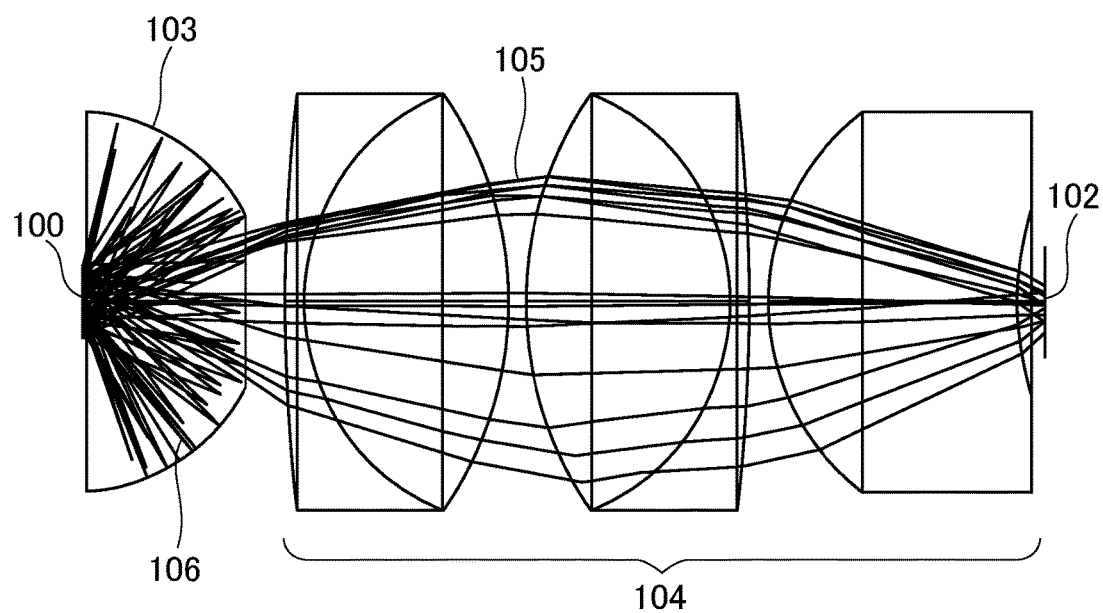
FIG. 24 shows a ray tracing chart by Monte Carlo simulation in the LED illumination apparatus according to the fourth embodiment of the present disclosure.
Figure 25:
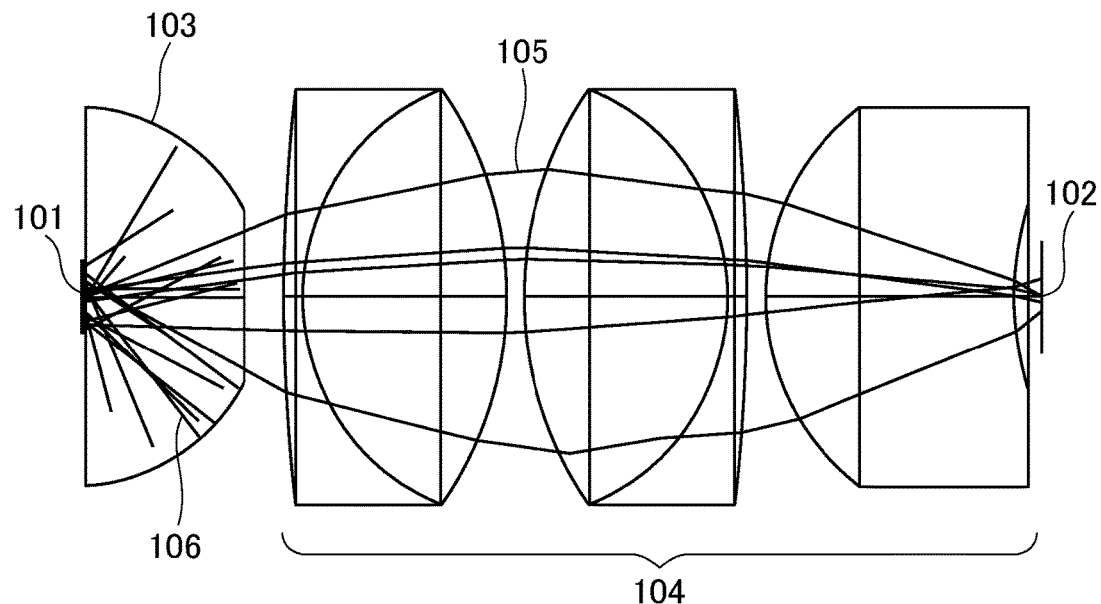
FIG. 25 shows a ray tracing chart by Monte Carlo simulation when a reflection coefficient of a hemispheric mirror of the present disclosure is equal to 0.

FIG. 24 and FIG. 25 respectively show ray tracing charts by Monte Carlo simulation of 20 rays. FIG. 24 shows an example in which the reflection coefficient of the mirror is 0.95, and FIG. 25 shows an example in which the reflection coefficient of the mirror is 0 for the sake of comparison. Referring to the figure, it is found that there are a plenty of rays repeating reflection and scattering between the LED and the hemispheric mirror.

Figure 26:
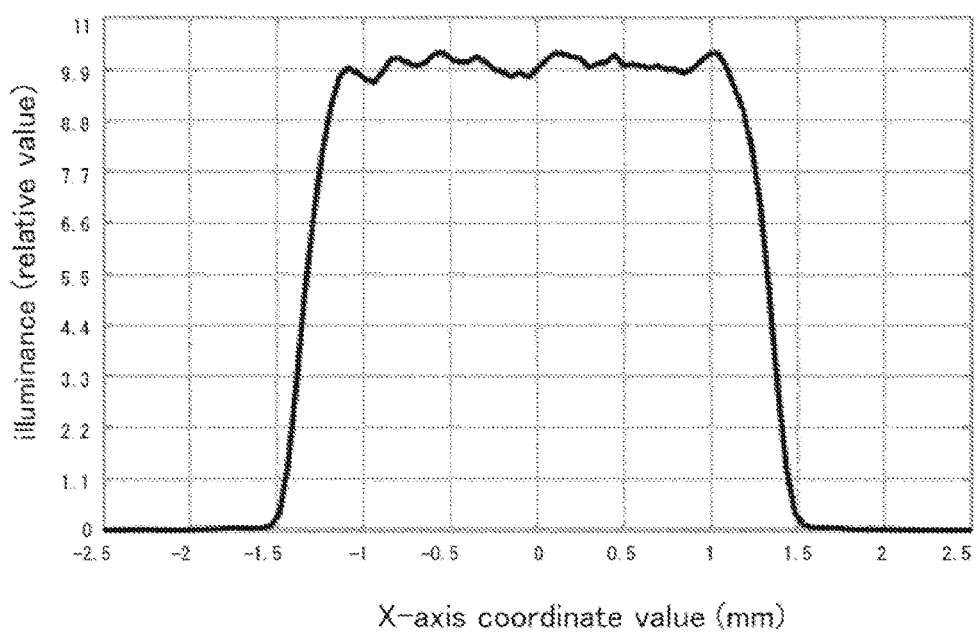
FIG. 26 shows an illuminance distribution chart of an image face in the LED illumination apparatus according to the fourth embodiment of the present disclosure.

FIG. 26 shows an illuminance distribution of an image face by Monte Carlo simulation of 1,000,000 rays. When the reflection coefficient of the LED is 0.95, and the reflection coefficient of the hemispheric mirror is 0.95, the focusing efficiency (the luminous flux focused on the image face of which diameter is 3 mm/LED output luminous flux) is 0.56, and this value is about 3 times of the case in which the hemispheric mirror is absent. In a case where the LED of which luminance is 100 Mcd/m$^2$ is employed, the input of the optical fiber is obtained as 310 l m/mm$^2$, and is obtained as an input which is equivalent to that of the xenon lamp.

Figure 27:
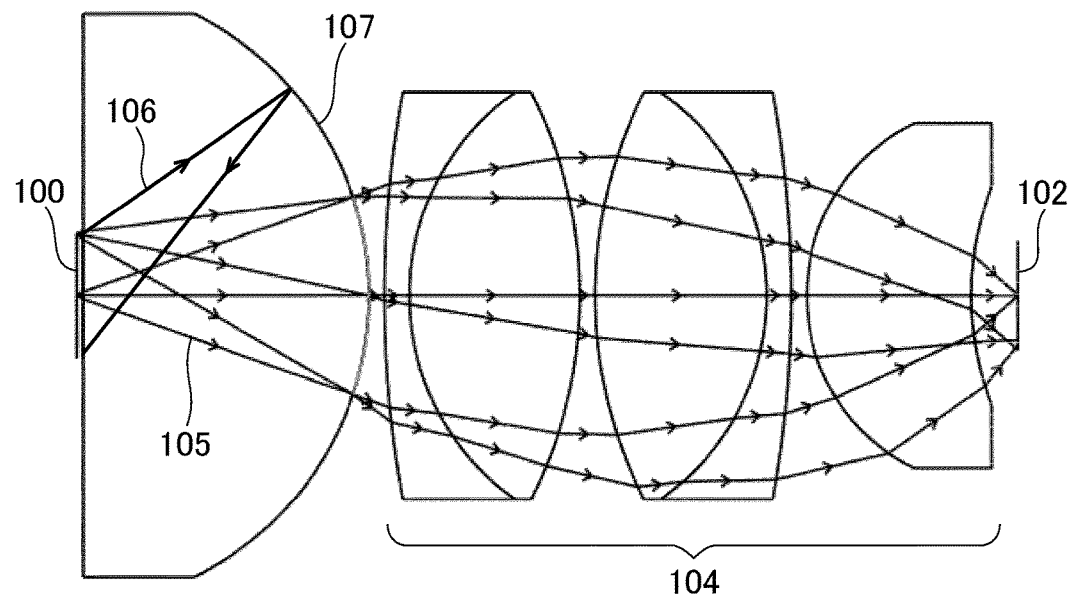
FIG. 27 shows a ray tracing chart in the LED illumination apparatus according to the fifth embodiment of the present disclosure.

FIG. 27 shows an embodiment of the plano convex lens mirror 107 and the focusing lens 104, and Table 2 shows lens data.

TABLE 2

| Face number | Curvature radius: ri | Interval: di | Refractive index: ni | Abbe number: vi |
|---|---|---|---|---|
| 0:: LED | Infinity | 0.2 | | |
| 1 | Infinity | 9.2 | 1.5168 | 64.17 |
| 2 | −10 | 0.5 | | |
| 3 | 35.8 | 0.8 | 2.0033 | 28.27 |
| 4 | 7.9 | 5.5 | 1.883 | 40.77 |
| 5 | −14.3 | 0.5 | | |
| 6 | 14.3 | 5.5 | 1.883 | 40.77 |
| 7 | −7.9 | 0.8 | 2.0033 | 28.27 |
| 8 | −35.8 | 0.5 | | |
| 9 | 6.1 | 5.3 | 1.883 | 40.77 |
| 10 | 9.6 | 1.5 | | |
| 11: Image | Infinity | | | |

The LED diameter: d LED is 4 mm, the curvature radius of the plano convex lens mirror: r is 10 mm, the diameter of circular aperture of the plano convex lens mirror: D is 6.3 mm, the diameter of the focusing image: d image is 3.05 mm, the focusing NA: NA image is 0.55, the refractive index of the plano convex lens: n is 1.517, the focal length of the focusing lens: f is 4.85 mm, and a relational expression that dLED·nD/2r=4×1.52×6.3/(2×10)=1.92≈1.63=3.05×0.55=d image×NA image, f=4.85≈4.94=10×3/4/1.517=r×dimage/d LED/n is established. The distance between the LED and the image is 30.3 mm, and this value is shorter than that of the hemispheric mirror approach by 40%.

Figure 28:
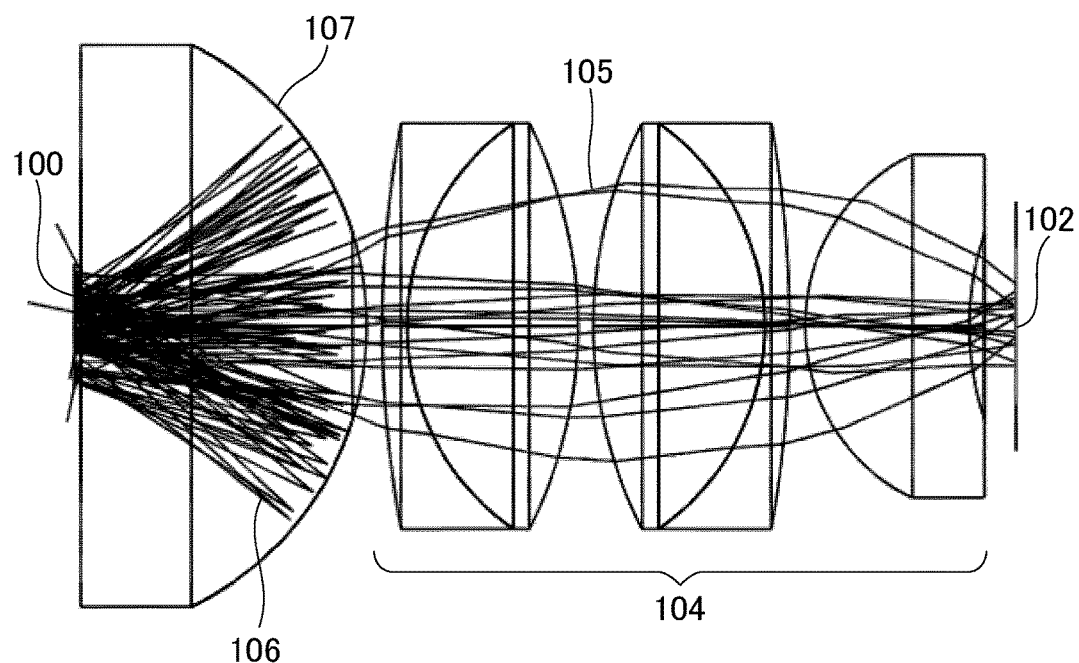
FIG. 28 shows a ray tracing chart by Monte Carlo simulation in the LED illumination apparatus according to the fifth embodiment of the present disclosure.

FIG. 28 shows a ray tracing chart by Monte Carlo simulation of 20 rays. Referring to the figure, it is found that a peripheral part of the plano convex lens mirror is not used.

Figure 29:
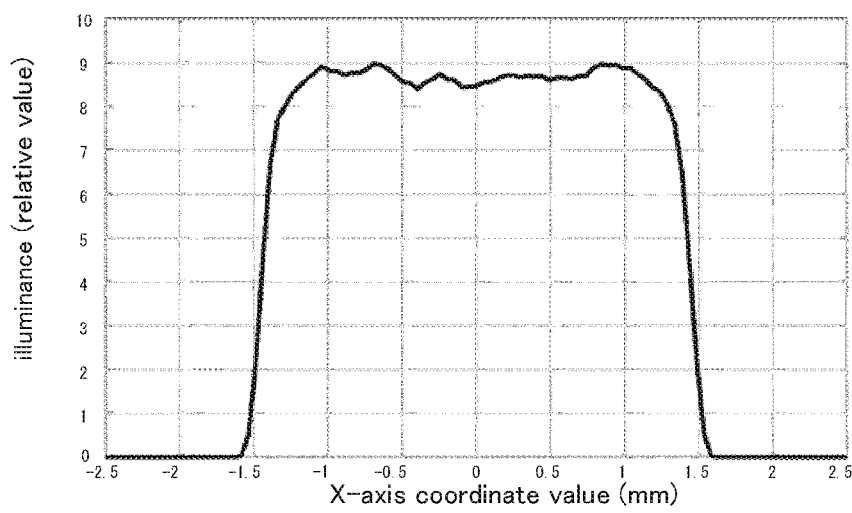
FIG. 29 shows an illuminance distribution chart of an image face in LED illumination apparatus according to the fifth embodiment of the present disclosure.

FIG. 29 shows an illuminance distribution of an image face by Monte Carlo simulation of 1,000,000 rays. When the reflection coefficient of the LED is 0.95, and the reflection coefficient of the hemispheric mirror is 0.95, the focusing efficiency (the luminous flux focused on the image face of diameter is 3 mm/the LED output luminous flux) is 0.56, and the same result as that of the hemispheric mirror approach is obtained.

The plano convex lens mirror approach of FIG. 27 is superior to the hemispheric mirror approach of FIG. 25 in that:

the mirror diameter can be reduced, since the LED light is focused at the center of the mirror due to the convex lens effect of a first face 107c of the plano convex lens mirror;

there is no need to use the peripheral part of the mirror in which reflection coating is difficult for the same reason, and manufacturing is easy;

there is no structure at the outside more significantly than the mirror, and a compact design can be made;

cooling is easily carried out, since the mirror is provided outside; and the focal length of the focusing lens is reduced due to the effect of the plano convex lens, and a compact design can be made, etc.

It is desirable that the NA of the focusing light according to the present disclosure be substantially equal to the NA of the optical fiber employed. In a case where an attempt is made to increase the output light of the optical fiber, it is sufficient if the NA of the focusing light is somewhat greater than the NA of the optical fiber. This is because, in a case where the optical fiber is a bundled fiber, individual optical fibers somewhat inclines at the incidence end, and according to such inclination, the light of a large NA can be guided. For example, in a case where an optical fiber of which NA is 0.6 inclines at 3 degrees, the maximum light can be made incident to the optical fiber by setting the NA of the focusing light to sin ($\sin^{-1}$ 0.6+3)=0.64 or more.

However, the incidence efficiency (luminous flux of the optical fiber output end/luminous flux of the optical fiber input end) lowers. Conversely, in a case where an attempt is made to increase the incidence efficiency, it is desirable that the NA of the focusing light be lower than the NA of the optical fiber.

Figure 30:
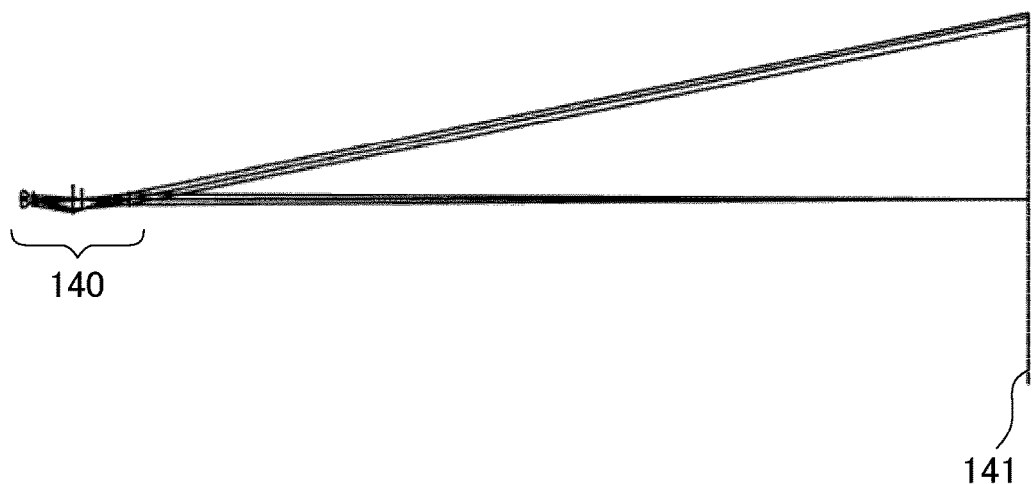
FIG. 30 shows a paraxial approximate ray tracing chart in an LED illumination apparatus in a sixth embodiment of the present disclosure.
Figure 31:
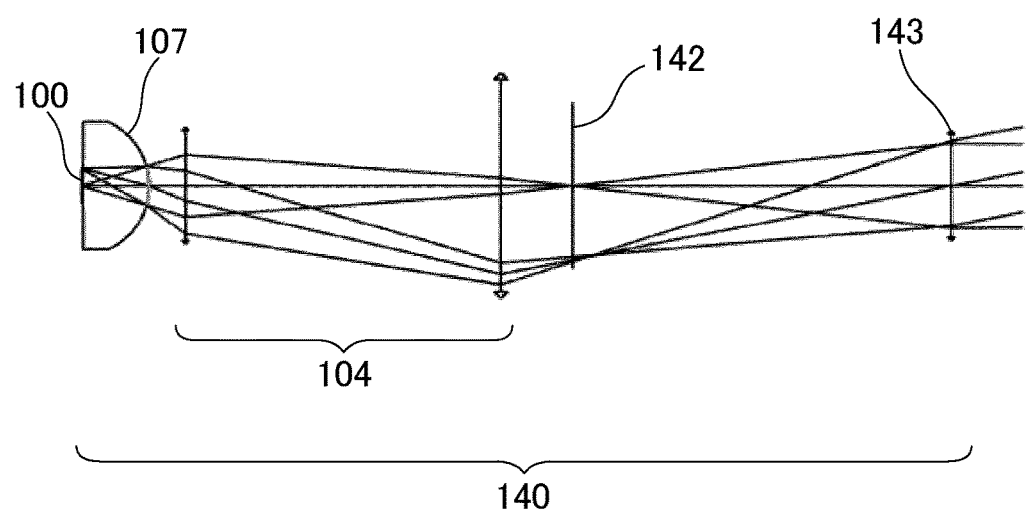
FIG. 31 is a partially enlarged view of the paraxial approximate ray tracing chart in the LED illumination apparatus in the sixth embodiment of the present disclosure.

FIG. 30 shows a paraxial approximate ray tracing chart when the present disclosure is applied to a projector. FIG. 31 is an enlarged view of a projector part 140. The LED 100 is formed as an image on a liquid crystal panel 142 by a focusing lens 104, and the liquid crystal panel is formed as an image on a screen 141 by a projection lens 143. The focusing lens 104 must be designed so as to adjust the direction of a principal ray and the emission NA to the NA of the projection lens 143.

The design values of the embodiment is as follows. That is, the LED diagonal dimension: d LED is 5 mm (4 mm×3 mm), the curvature radius of the plano convex lens mirror: r is 10 mm, the diameter of the circular aperture of the plano convex lens mirror: D is 5.47 mm, the diagonal dimension of the focusing image: d image is 20 mm (substantially equal to the diagonal dimension of the liquid crystal panel), the NA of the focusing light: NA image is 0.109 (substantially equal to the NA of the projection lens=0.1, F-number=5), and the refractive index of the plano convex lens: n is 1.517, and a relational expression that dLED×nD/2r=5×1.517×5.47/(2×10)=2.07≈2.18=20×0.109=d image×NA image is established.

Thus, according to the present disclosure, an illumination apparatus with a large optical fiber input can be achieved without a need to change an LED output. As long as the reflection coefficient of each of the mirrors 103a, 107a and the LED 100 is 1, and aberration of each of the mirrors 103a, 107a is zero, the following relational expression is established:

Optical fiber input in a case where the mirror is present/Optical fiber input in a case where the mirror is absent=Increment=(LED dimension/image dimension/image NA)$^2$ In a case where the LED diameter is 4 mm, the focusing image diameter and the optical fiber diameter are equal to each other, a respective one of which is 3 mm, the NA of the focusing light and the NA of the optical fiber are equal to each other, a respective one of which is 0.6, a relational expression that increment=(4/3/0.6)$^2$=4.9 times is obtained.

While the present disclosure has been described with reference to the particular illustrative embodiments, it is not to be restricted by the embodiments. It is to be appreciated that those skilled in the art can change or modify the embodiments without departing from the scope and spirit of the present disclosure.

What is claimed is:

1. An LED illumination apparatus comprising an LED and a hemispheric mirror,
   wherein the LED has a planar and point-symmetrical shape at a light emitting part thereof, a light emission angle distribution of which is a Lambert distribution and a light emission face of which is a scattering face;
   the hemispheric mirror forms a reflection face on an interior face thereof, and has an aperture at a center thereof, while the reflection face is disposed so as to oppose to the LED;
   a normal line of the LED and an optical axis of the hemispheric mirror are coincident with each other;
   an interval between the LED and the hemispheric mirror is equal to or smaller than a curvature radius of the hemispheric mirror;
   a dimension of the aperture of the hemispheric mirror is substantially equal to a radiation dimension; and
   when a dimension of the LED is d LED, the interval between the LED and the hemispheric mirror is t, and a radiation NA is NA object, a relational expression that sin ($\tan^{-1}$ d LED/2t)≈NA object is established.

2. An LED illumination apparatus comprising an LED and a plano convex lens mirror,
   wherein the LED has a planar and point-symmetrical shape at a light emitting part thereof, a light emission angle distribution of which is a Lambert distribution and a light emission face of which is a scattering face;
   the plano convex lens mirror forms a reflection face at a periphery of a convex interior face thereof, and has an aperture of the reflection face at a center thereof, while the LED and a planar side of the plano convex lens mirror are disposed at intervals so as to oppose to and to be parallel to each other;
   a normal line of the LED and an optical axis of the plano convex lens mirror are coincident with each other;
   an interval between the LED and a spherical face of the plano convex lens mirror is equal to or smaller than a curvature radius of the plano convex lens mirror;
   a dimension of the aperture of the plano convex lens mirror is substantially equal to a radiation dimension; and
   when a dimension of the LED is d LED, the interval between the LED and the reflection face of the plano convex lens mirror is t, a refractive index of the plano convex lens mirror is n, and a radiation NA is NA object, a relational expression that n sin(tan$^{-1}$ d LED/2t)≈NA object is established.

3. The LED illumination apparatus according to claim 1, wherein an optical fiber is disposed at a position of the mirror aperture, and the radiation NA is substantially equal to an optical fiber NA.

4. The LED illumination apparatus according to claim 2, wherein an optical fiber is disposed at a position of the mirror aperture, and the radiation NA is substantially equal to an optical fiber NA.

5. An LED illumination apparatus comprising an LED and a hemispheric mirror,
- wherein the LED has a planar and point-symmetrical shape at a light emitting part thereof, a light emission angle distribution of which is a Lambert distribution and a light emission face of which is a scattering face;
- the hemispheric mirror forms a reflection face on an interior face thereof, and has a circular aperture at a center thereof, while the reflection face is disposed so as to oppose to the LED;
- a normal line of the LED and an optical axis of the hemispheric mirror are coincident with each other;
- an interval between the LED and the hemispheric mirror is equal to or smaller than a curvature radius of the hemispheric mirror; and
- when a dimension of the LED is d LED, a curvature radius of the plano convex lens mirror is r, a diameter of a circular aperture of the hemispheric mirror is D, a focusing image dimension is d image, and a focusing light NA is NA image, a relational expression that d LED×D/2r≈d image×NA image is established.

6. The LED illumination apparatus according to claim 5, further comprising a focusing lens,
- wherein the focusing lens is disposed so that an optical axis thereof is coincident with a normal line of the LED, and
- when a focal length of the focusing lens is f, a relational expression that f≈r×d image/d LED is established.

7. An LED illumination apparatus comprising an LED and a plano convex lens mirror,
- wherein the LED has a planar and point-symmetrical shape at a light emitting part thereof, a light emission angle distribution of which is a Lambert distribution and a light emission face of which is a scattering face;
- the mirror forms a reflection face on an interior face thereof, and has a circular aperture at a center thereof, while the LED and a planar side of the plano convex lens mirror are disposed at intervals so as to oppose to and to be parallel to each other;
- a normal line of the LED and an optical axis of the planar convex lend mirror are coincident with each other;
- an interval between the LED and a spherical face of the plano convex lens mirror is equal to or smaller than a curvature radius of the plano convex lens mirror; and
- when a dimension of the LED is d LED, a curvature radius of the plano convex lens mirror is r, a circular aperture diameter of the plano convex lens mirror is D, a dimension of a focusing image is d image, a focusing light NA is NA image, and a refractive index of the plano convex lens mirror is n, a relational expression that d LED×nD/2r≈d image×NA image is established.

8. The LED illumination apparatus according to claim 7, further comprising a focusing lens,
- wherein the focusing lens is disposed so that an optical axis thereof is coincident with a normal line of the LED, and
- when a focal length of the focusing lens is f, a relational expression that f≈r×d image/d LED/n is established.

9. The LED illumination apparatus according to claim 5, wherein an optical fiber is disposed at a position of the focusing image, and the focusing light NA is substantially equal to an optical fiber NA.

10. The LED illumination apparatus according to claim 7, wherein an optical fiber is disposed at a position of the focusing image, and the focusing light NA is substantially equal to an optical fiber NA.

* * * * *